United States Patent
Matsuda et al.

(10) Patent No.: US 7,496,934 B2
(45) Date of Patent: Feb. 24, 2009

(54) CHASSIS AND CARTRIDGE HOLDER WITH EJECTION MECHANISM FOR EJECTING A CARTRIDGE FROM A DISK APPARATUS

(75) Inventors: Mikinori Matsuda, Kanagawa (JP); Kazuhito Kurita, Kanagawa (JP); Toru Morikawa, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 11/107,804

(22) Filed: Apr. 18, 2005

(65) Prior Publication Data

US 2005/0248879 A1 Nov. 10, 2005

(30) Foreign Application Priority Data

May 7, 2004 (JP) ............................. 2004-138047

(51) Int. Cl.
  *G11B 17/04* (2006.01)
(52) U.S. Cl. ..................... 720/636; 360/99.06
(58) Field of Classification Search ......... 720/636–638, 720/640; 360/99.06, 99.02
  See application file for complete search history.

(56) References Cited

U.S. PATENT DOCUMENTS

| | | | | |
|---|---|---|---|---|
| 5,485,329 A * | 1/1996 | Lee | ........................ | 360/99.06 |
| 5,490,023 A * | 2/1996 | Watanabe | ................ | 360/99.06 |
| 5,504,730 A * | 4/1996 | Kanada | ...................... | 720/640 |
| 5,815,344 A * | 9/1998 | Aoki | ....................... | 360/99.06 |
| 5,831,958 A * | 11/1998 | Kurita | ........................ | 720/637 |
| 6,118,618 A * | 9/2000 | Kumakura | .............. | 360/99.02 |
| 6,118,619 A * | 9/2000 | Kabasawa | ................ | 360/99.06 |
| 6,178,149 B1 * | 1/2001 | Nakamura et al. | .......... | 720/638 |
| 6,487,159 B1 * | 11/2002 | Hamada | ..................... | 720/632 |
| 6,542,329 B2 * | 4/2003 | Kojima | ..................... | 360/99.06 |
| 2005/0248879 A1 | 11/2005 | Matsuda et al. | | |
| 2005/0251816 A1 | 11/2005 | Matsuda et al. | | |
| 2005/0251817 A1 | 11/2005 | Yamada et al. | | |
| 2006/0080698 A1 | 4/2006 | Kurita et al. | | |

(Continued)

FOREIGN PATENT DOCUMENTS

JP 57-79971 5/1982

(Continued)

*Primary Examiner*—Brian E. Miller
*Assistant Examiner*—Matthew G Kayrish
(74) *Attorney, Agent, or Firm*—Oblon, Spivak, McClelland, Maier & Neustadt, P.C.

(57) ABSTRACT

The present invention provides lock release means that allows spring constant of the lock release means to be set to any desired value without regard to a material used for a cartridge holder. A disk recording and/or reproducing apparatus includes: recording and/or reproducing means disposed in a chassis; a cartridge holder supported on the chassis movably between an insertion and withdrawal position, at which a disk cartridge is inserted or removed, and a recording and reproducing position, at which the disk cartridge is recorded or reproduced by the recording and/or reproducing means; an eject lever disposed on an upper surface of the chassis so as to be movable in a disk cartridge insertion and withdrawal direction; eject lever lock means disposed on the upper surface of the chassis; and lock release means mounted on the cartridge holder such that a leading end side of the lock release means advances into the cartridge holder from an upper surface of the cartridge holder.

7 Claims, 19 Drawing Sheets

U.S. PATENT DOCUMENTS

2006/0168597 A1    7/2006    Yamada et al.

FOREIGN PATENT DOCUMENTS

| | | |
|---|---|---|
| JP | 7-6493 | 1/1995 |
| JP | 9-259501 | 10/1997 |
| JP | 11-353845 | 12/1999 |
| JP | 2004-79046 | 3/2004 |

* cited by examiner

CHASSIS AND CARTRIDGE HOLDER WITH EJECTION MECHANISM FOR EJECTING A CARTRIDGE FROM A DISK APPARATUS

BACKGROUND OF THE INVENTION

The present invention relates to a disk recording and/or reproducing apparatus including an eject lever for unloading a disk cartridge from a cartridge holder.

An apparatus as shown in FIG. 26 is known as an example of a disk recording and/or reproducing apparatus including an eject lever. In a disk recording and/or reproducing apparatus 401 shown in FIG. 26, when a disk cartridge 402 is inserted into a cartridge holder 403, a front surface 402a of the disk cartridge 402 pushes an eject lever 404. The eject lever 404 then overcomes an urging force of urge means 405 and is rotated. When the disk cartridge 402 is entirely accommodated in the cartridge holder 403, eject lever lock means 406 locks the eject lever 404 in position. The disk cartridge 402 is thereby prevented from ejecting from the cartridge holder 403. In this condition, the cartridge holder 403 is moved to a recording and reproducing position on the side of a chassis 407 and recording and/or reproducing of the disk cartridge 402 is then carried out. After recording and/or reproducing of the disk cartridge 402 has been completed, the cartridge holder 403 is moved from the recording and reproducing position to a cartridge insertion and withdrawal position. Lock release means 408 then unlocks the eject lever 404. This allows the eject lever 404 to be rotated by the urge means 405, thereby unloading the disk cartridge 402 from the cartridge holder 403.

More specifically, the eject lever 404 is rotatably and axially movably mounted to the chassis 407 via a shaft 409. The eject lever 404 is given a rotational force, and a pressing force to the chassis 407, by a coil spring as the urge means 405.

As described in the foregoing, when the disk cartridge 402 is inserted into the cartridge holder 403, the front surface 402a of the disk cartridge 402 pushes to rotate the eject lever 404. When the eject lever 404 is rotated to reach a point, at which the eject lever 404 clears a top surface of the chassis 407, the urge means 405 rotates the eject lever 404 in the direction of an arrow A. An engagement tab 406a included in the eject lever 404 is then engaged with an engagement recess 406b in a side surface of the chassis 407, thereby preventing the eject lever 404 from rotating in a return direction.

Reference is now made to FIG. 27. When the cartridge holder 403 is rotated toward the side of the chassis 407 in order to perform recording and/or reproducing, an inclined cam surface 410 included in the lock release means 408 contacts a cam engagement portion 411 included in the eject lever 404, causing the eject lever 404 to counteract the urging force of the urge means 405 and to escape in the direction of an arrow B. The cam engagement portion 411 is thereafter positioned on an eject lever operating surface 412 that continues to an upper end of the inclined cam surface 410. After recording and/or reproducing has been completed, the cartridge holder 403 is moved to the cartridge insertion and withdrawal position. Then, referring to FIG. 26, the eject lever operating surface 412 causes the eject lever 404 to rotate in the direction of an arrow C. The engagement tab 406a is then disengaged from the engagement recess 406b, allowing the eject lever 404 to be rotated by the urging force of the urge means 405. The disk cartridge 402 is thereby unloaded from the cartridge holder 403. Another arrangement may be made for the lock release means 408. Specifically, referring to FIG. 29, the lock release means 408 is made to deflect so as to temporarily escape from the cam engagement portion 411 of the eject lever 404. The lock release means 408 is then returned to the position of engagement with the cam engagement portion 411 by a returning force of the lock release means 408. (See, for example, Patent Document 1.)

[Patent Document 1]
Japanese Patent Laid-open No. Hei 9-259501

SUMMARY OF THE INVENTION

In the related art disk recording and/or reproducing apparatus, there has been a problem, in which it is difficult to adopt the arrangement for the lock release means, in which the lock release means is made to deflect so as to temporarily escape from the cam engagement portion of the eject lever before being returned to the position of engagement with the cam engagement portion by the returning force of the lock release means. This is because of the following reason. Specifically, referring to FIG. 26, the cartridge holder and the lock release means are formed integrally with each other from the same material. This restricts the material, length, and the like of the lock release means, which, in turn, makes it difficult to set spring constant of the lock release means to a desired value.

It is therefore an object of the present invention to provide lock release means allowing the spring constant to be set to any desired value without regard to the material used for the cartridge holder.

According to an embodiment of the present invention, there is provided a disk recording and/or reproducing apparatus, including:

recording and/or reproducing means disposed in a chassis, the recording and/or reproducing means recording and/or reproducing a disk cartridge;

a cartridge holder supported on the chassis movably between an insertion and withdrawal position, at which the disk cartridge is inserted or removed, and a recording and reproducing position, at which the disk cartridge is recorded or reproduced by the recording and/or reproducing means;

an eject lever disposed on an upper surface of the chassis so as to be movable in a disk cartridge insertion and withdrawal direction, the eject lever being pressed by an insertion end of the disk cartridge inserted in the cartridge holder to be moved in the disk cartridge insertion and withdrawal direction;

eject lever lock means disposed on the upper surface of the chassis, the means locking the eject lever moved in the disk cartridge insertion and withdrawal direction; and lock release means mounted on the cartridge holder such that a leading end side of the lock release means advances into the cartridge holder from an upper surface of the cartridge holder, the lock release means moving the eject lever in a direction of releasing locking by the eject lever lock means when the cartridge holder is moved from the recording and reproducing position to the insertion and withdrawal position.

BRIEF DESCRIPTION OF THE DRAWINGS

The present invention is described hereinafter with reference to the accompanying drawings, in which.

DETAILED DESCRIPTION OF THE PREFERRED EMBODIMENT

The disk recording and/or reproducing apparatus according to a preferred embodiment of the present invention will be described in the following order: (1) general structure of the entire apparatus and structure of lock release means; (2) structure of disk cartridge; (3) structure of cartridge holder; (4) structure of chassis; (5) structure of recording and/or reproducing means; (6) structure of eject lever; (7) structure of urge means and eject lever lock means; (8) miscellaneous structures; and (9) operation.

Figure 1:
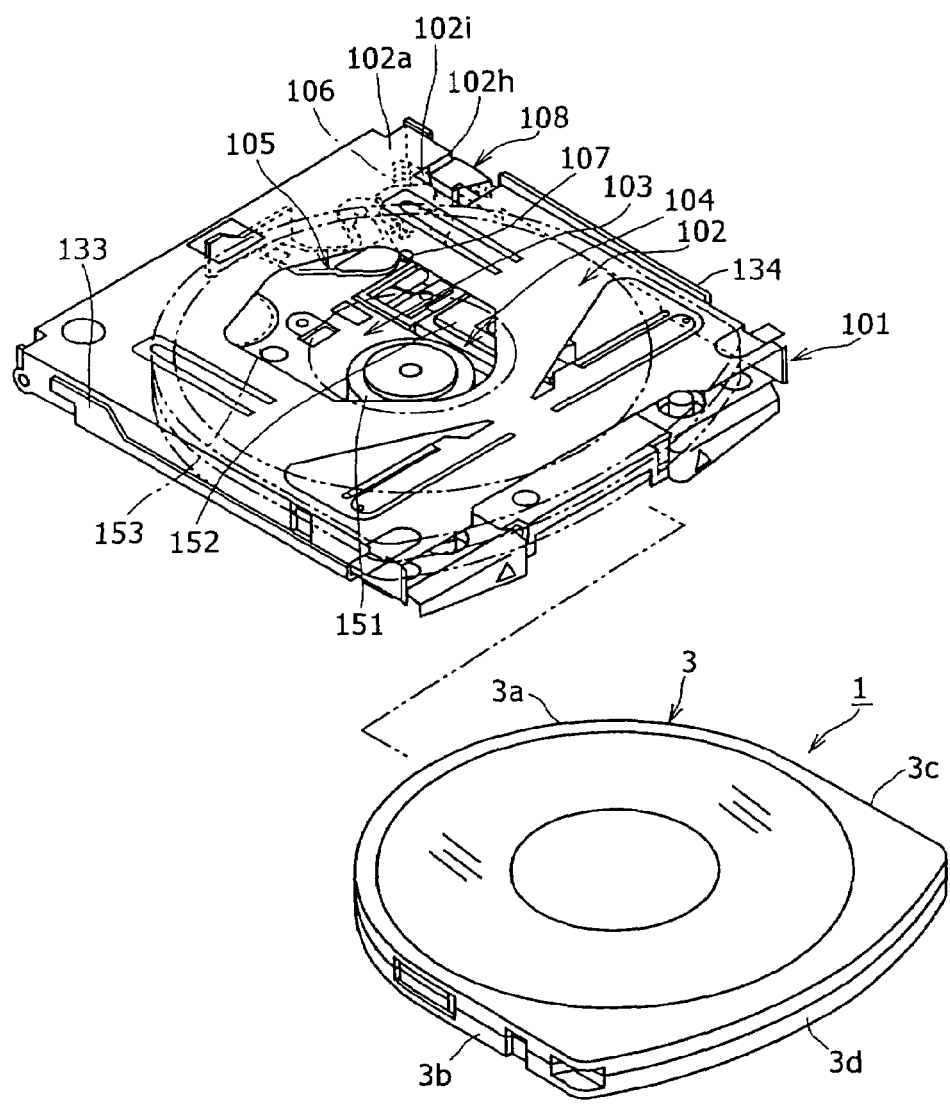
FIG. 1 is a perspective view showing a disk recording and/or reproducing apparatus according to an embodiment of the present invention.
Figure 2:
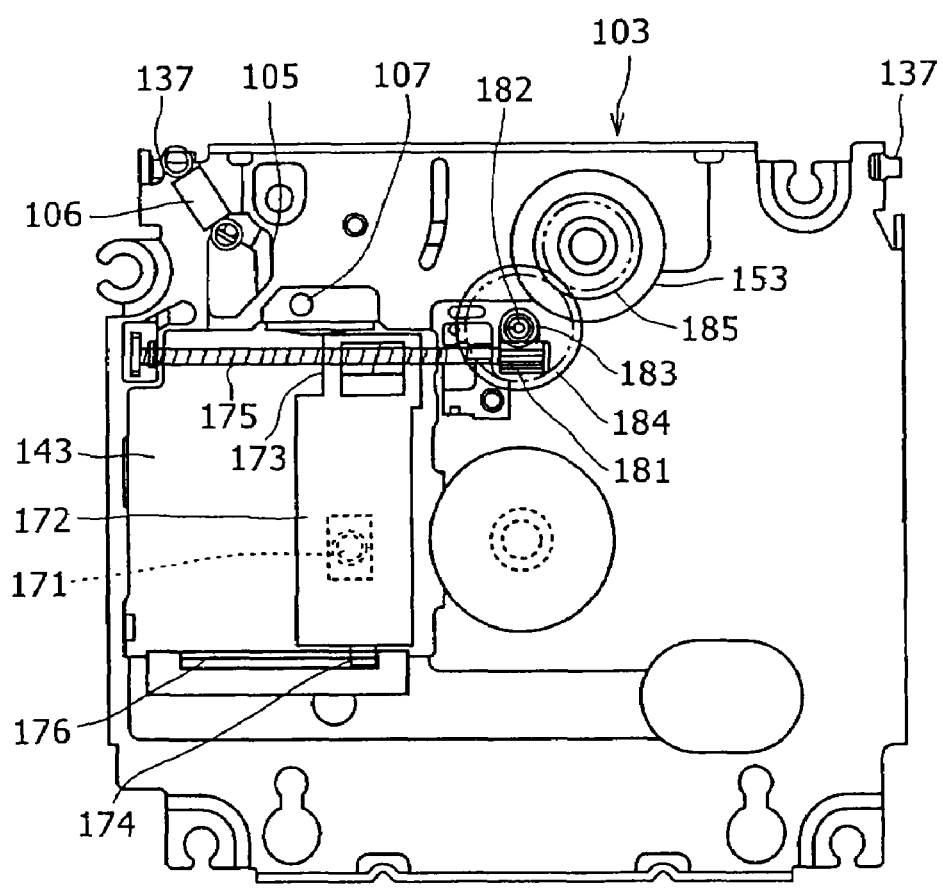
FIG. 2 is a plan view showing the disk recording and/or reproducing apparatus according to the embodiment of the present invention, as viewed from a backside thereof.
Figure 3:
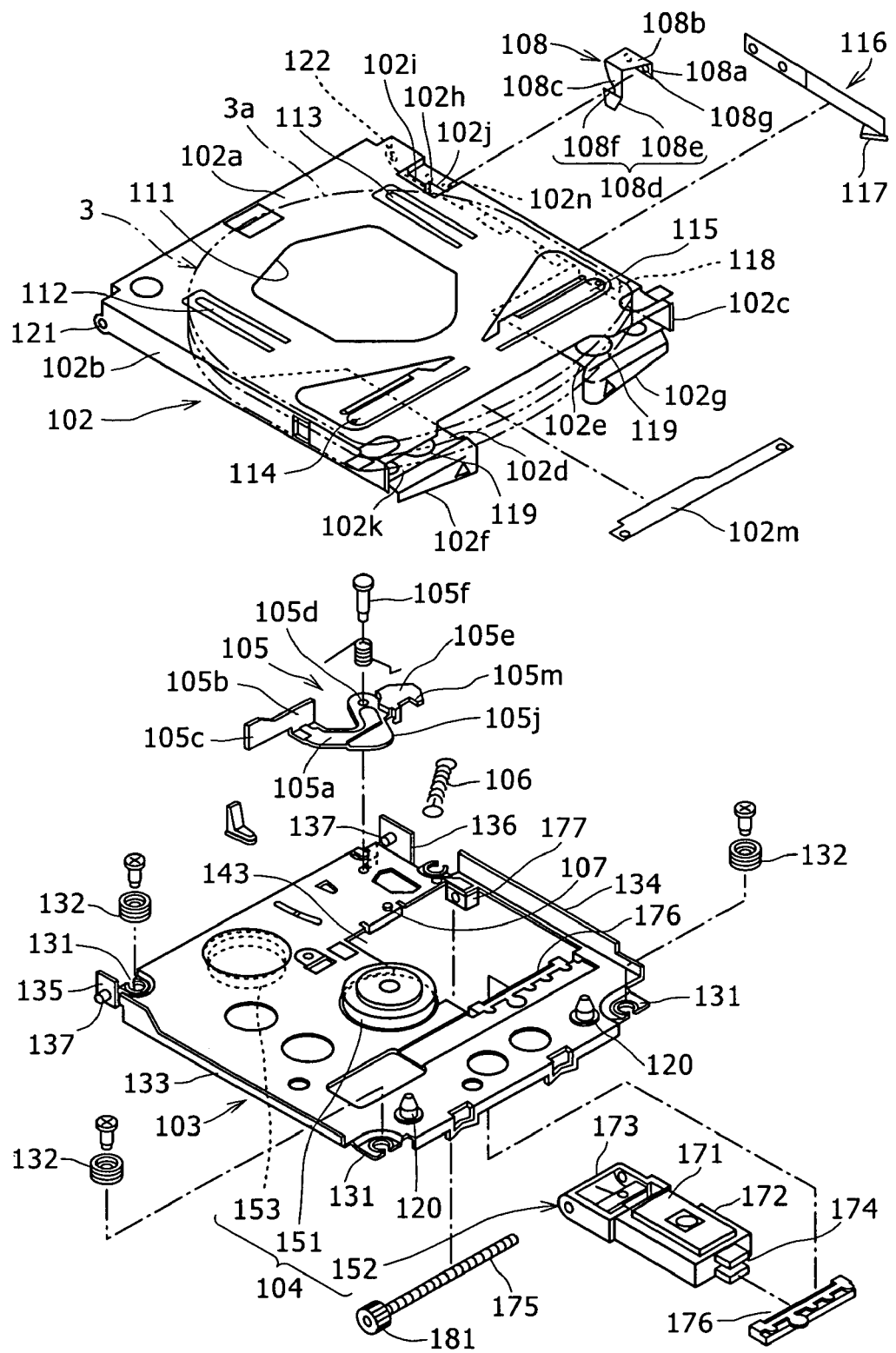
FIG. 3 is an exploded perspective view showing the disk recording and/or reproducing apparatus according to the embodiment of the present invention.

(1) General Structure of the Entire Apparatus and Structure of Lock Release Means FIG. 1 is a perspective view showing a disk recording and/or reproducing apparatus according to an embodiment of the present invention. FIG. 2 is a plan view showing the disk recording and/or reproducing apparatus according to the embodiment of the present invention, as viewed from a backside thereof. FIG. 3 is an exploded perspective view showing the disk recording and/or reproducing apparatus according to the embodiment of the present invention. A disk recording and/or reproducing apparatus 101 includes a cartridge holder 102, a chassis 103, recording and/or reproducing means 104, an eject lever 105, an urge means 106, eject lever lock means 107, and lock release means 108. Specifically, the cartridge holder 102 is a housing, into which a disk cartridge 1 is inserted and in which the disk cartridge 1 is held. The chassis 103 supports the cartridge holder 102 such that the cartridge holder 102 can move between a cartridge insertion and withdrawal position and a recording and reproducing position. The recording and/or reproducing means 104, disposed in the chassis 103, performs recording and/or reproducing operation relative to the disk cartridge 1. The eject lever 105 is disposed in the chassis 103 so as to be rotationally moved (hereinafter simply referred to as being rotatable) in an insertion or withdrawal direction of the disk cartridge 1 and so as to be moved toward or away from the chassis 103. The eject lever 105 is rotated by being pushed by the disk cartridge 1 inserted into the cartridge holder 102. The urge means 106 gives the eject lever 105 a rotational force in a disk cartridge unloading direction and an urge force in a direction to approach the chassis 103. The eject lever lock means 107 locks the eject lever 105 rotated by insertion of the disk cartridge 1 in the chassis 103. The lock release means 108 releases locking of the eject lever 105 by the eject lever lock means 107 when the cartridge holder 102 is rotated from the recording and reproducing position to the cartridge insertion and withdrawal position. The lock release means 108 is formed from a flat spring separately from the cartridge holder 102 and mounted on the cartridge holder 102.

Figure 4:
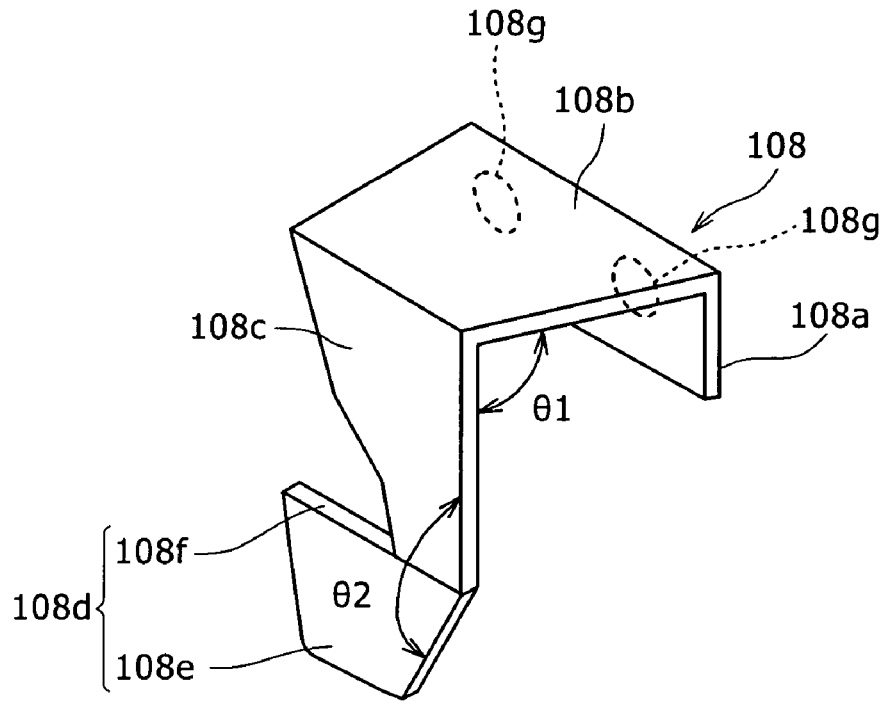
FIG. 4 is a perspective view showing lock release means.
Figure 5:
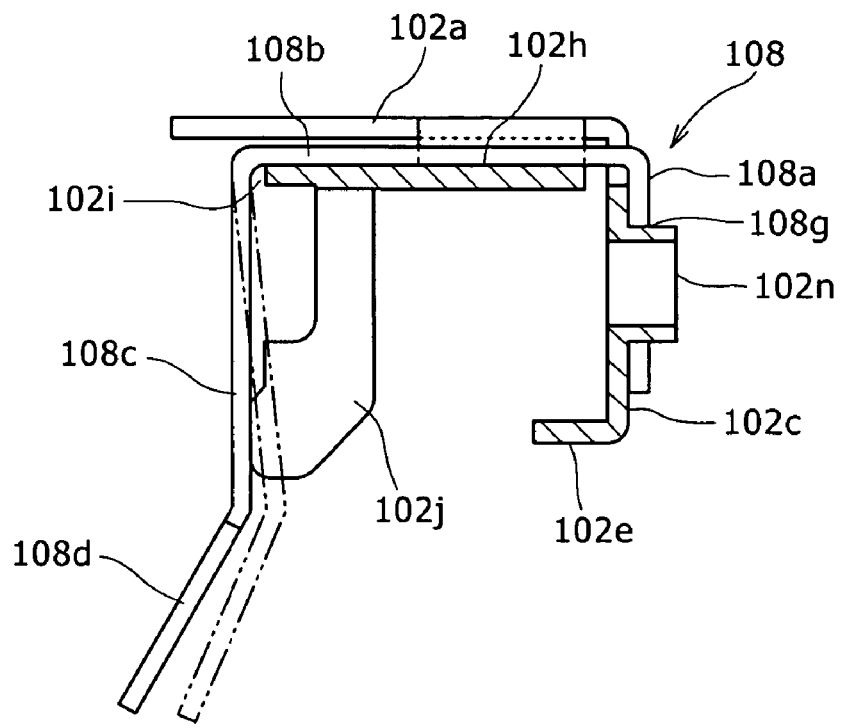
FIG. 5 is a cross sectional view showing a condition, in which the lock release means is mounted.

Referring to FIGS. 1, 4, and 5, the lock release means 108 includes a mounting portion (an immovably attaching portion) 108a, an overlapping portion 108b, an elastic flap portion 108c, and an eject lever operating portion 108d. More specifically, the mounting portion 108a is immovably attached and secured to a side surface of the cartridge holder 102. The overlapping portion 108b continues from the mounting portion 108a in a condition bent substantially at a right angle therewith and overlaps an upper surface of a lock release means mounting portion 102h formed by indenting an upper surface 102a of the cartridge holder 102. The elastic flap portion 108c continues from the overlapping portion 108b in a condition bent at an acute angle θ1 (approximately 80°) relative thereto. The elastic flap portion 108c then enters the cartridge holder 102 through a cutout window portion 102*i* provided in the upper surface 102*a* of the cartridge holder 102 and extends toward the side of the chassis 103. The eject lever operating portion 108*d* continues from the elastic flap portion 108*c* in a condition bent at an obtuse angle θ (approximately 160°) relative thereto.

The eject lever operating portion 108*d* includes an inclined surface portion 108*e* and an engagement portion 108*f*. The inclined surface portion 108*e* is pressed by a side surface 105*m* of an operated portion 105*e* of the eject lever 105 to be described later so as to deflect the elastic flap portion 108*c*. The engagement portion 108*f* engages a lower surface 105*n* of the operated portion 105*e* when the elastic flap portion 108*c* makes a return motion as the inclined surface portion 108*e* is released from pressure by the side surface 105*m* of the operated portion 105*e*.

Referring to FIG. 5, the elastic flap portion 108*c* is what is called preloaded by being bent at substantially a right angle by being pressed by an elastic flap positioning portion 102*j* disposed on a lower surface of the lock release means mounting portion 102*h*. The elastic flap portion 108*c* is also positioned at a predefined position. The lock release means 108 is formed by bending a flat spring stock blanked to a predetermined shape.

Figure 6A:
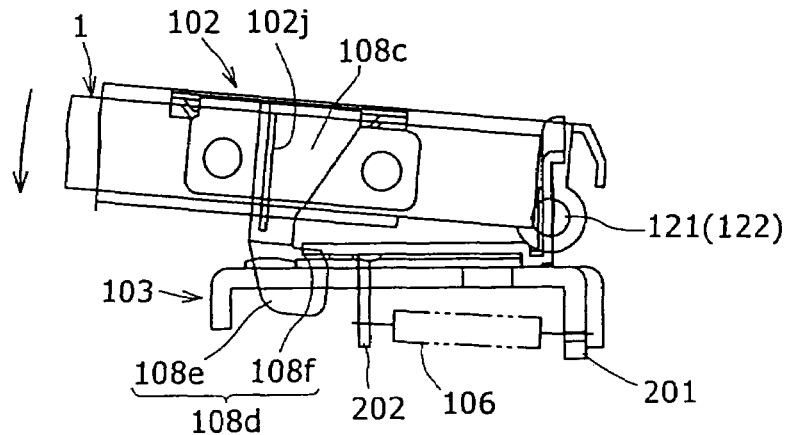
FIG. 6A is a side elevational view showing a condition, in which a side surface of an operated portion of an eject lever contacts an inclined surface portion of the lock release means.
Figure 6B:
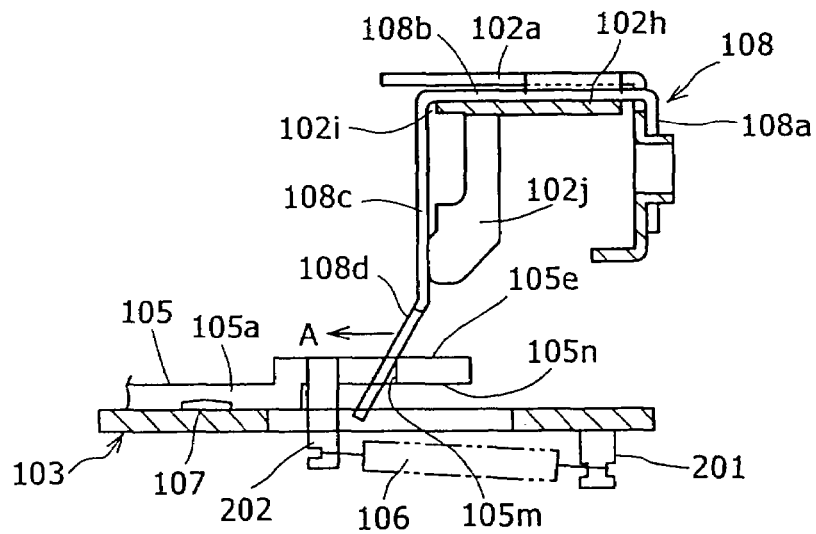
FIG. 6B is a front view showing the same.
Figure 6C:
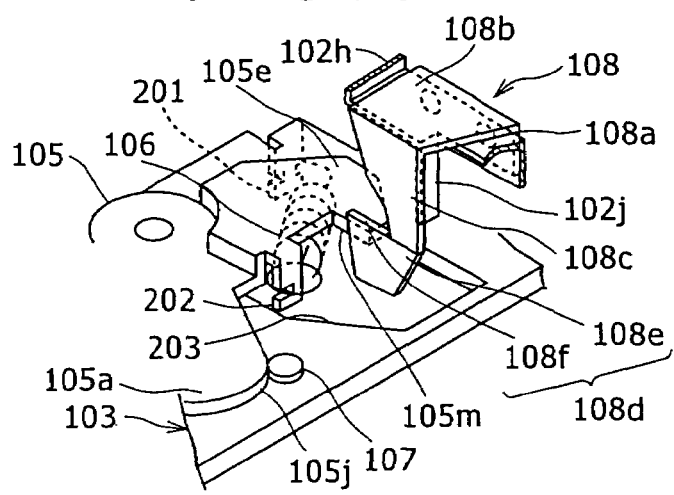
FIG. 6C is a perspective view showing the same.
Figure 7A:
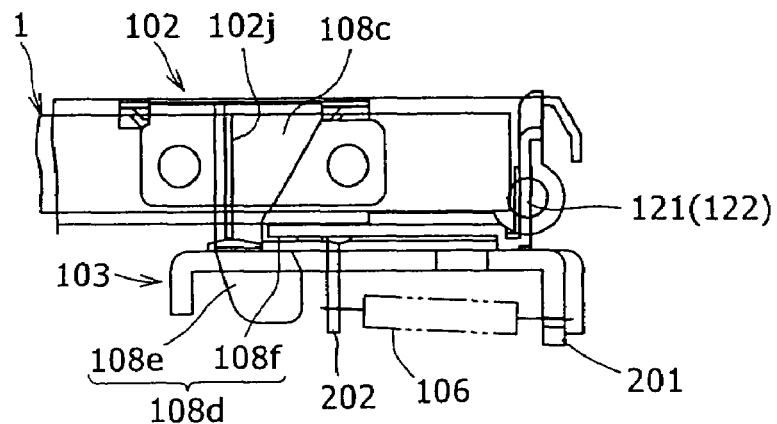
FIG. 7A is a side elevational view showing a condition, in which an elastic flap portion is elastically returned and an engagement portion is engaged with a lower surface of the operated portion of the eject lever.
Figure 7B:
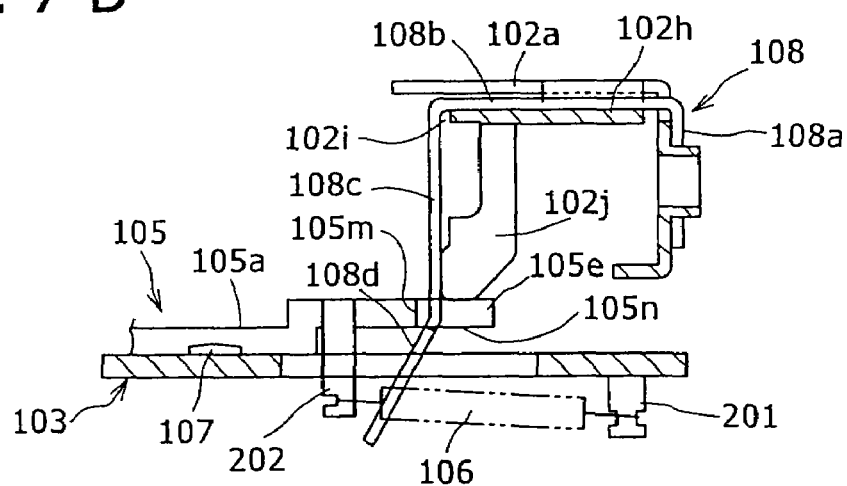
FIG. 7B is a front view showing the same.
Figure 7C:
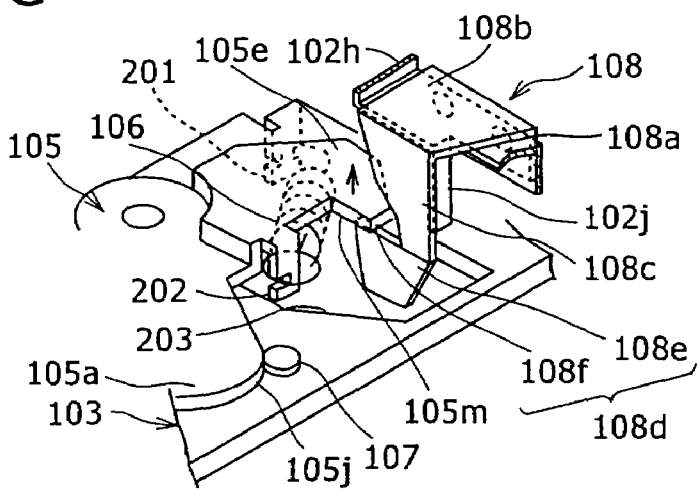
FIG. 7C is a perspective view showing the same.

Referring to FIGS. 6A, 6B, and 6C, the eject lever operating portion 108*d* is moved in an escaping direction (the direction of an arrow A) when the cartridge holder 102 is moved from the cartridge insertion and withdrawal position to the recording and reproducing position. At this time, the inclined surface portion 108*e* is pressed by the side surface 105*m* of the operated portion 105*e* of the eject lever 105 to be described in detail later. Reference is now made to FIGS. 7A, 7B, and 7C. When the cartridge holder 102 moves to the cartridge recording and reproducing position, the pressure on the inclined surface portion 108*e* by the side surface 105*m* of the operated portion 105*e* is released, causing the elastic flap portion 108*c* to make a return motion, that is, to return elastically. The engagement portion 108*f* then engages the lower surface 105*n* of the operated portion 105*e*.

The operation of moving the cartridge holder 102 from the cartridge insertion and withdrawal position to the recording and reproducing position after recording and/or reproducing has been completed is performed as follows. Specifically, referring to FIGS. 8A, 8B, and 8C, the eject lever 105 is raised via the lower surface 105*n* of the operated portion 105*e* of the eject lever 105, leaving an upper surface of the chassis 103. Locking of the eject lever 105 by the eject lever lock means 107 is then released. The eject lever 105 is now rotated by the urging force of the urge means 106, pushing the disk cartridge 1 out of the cartridge holder 102.

The lock release means 108 is disposed in an idle space as a substantially triangular dead space formed by an arcuate front surface 3*a* of a cartridge main body 3 of the disk cartridge 1 inserted in the cartridge holder 102, and one side surface and a front surface of the cartridge holder 102. In addition, the cartridge holder 102 is rotatably mounted to the chassis 103. When the cartridge holder 102 is rotationally moved from the cartridge insertion and withdrawal position to the recording and reproducing position, locking of the eject lever 105 by the eject lever lock means 107 is released.

(2) Structure of Disk Cartridge

Figure 9:
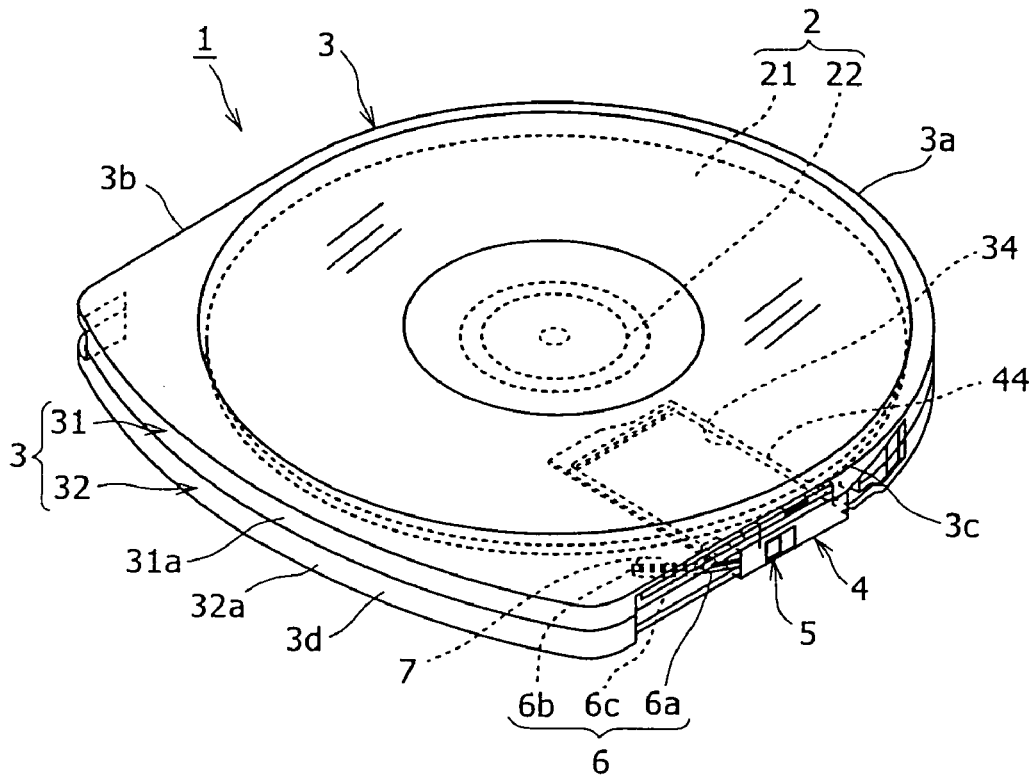
FIG. 9 is a perspective view showing a disk cartridge (with a shutter closed)
Figure 10:
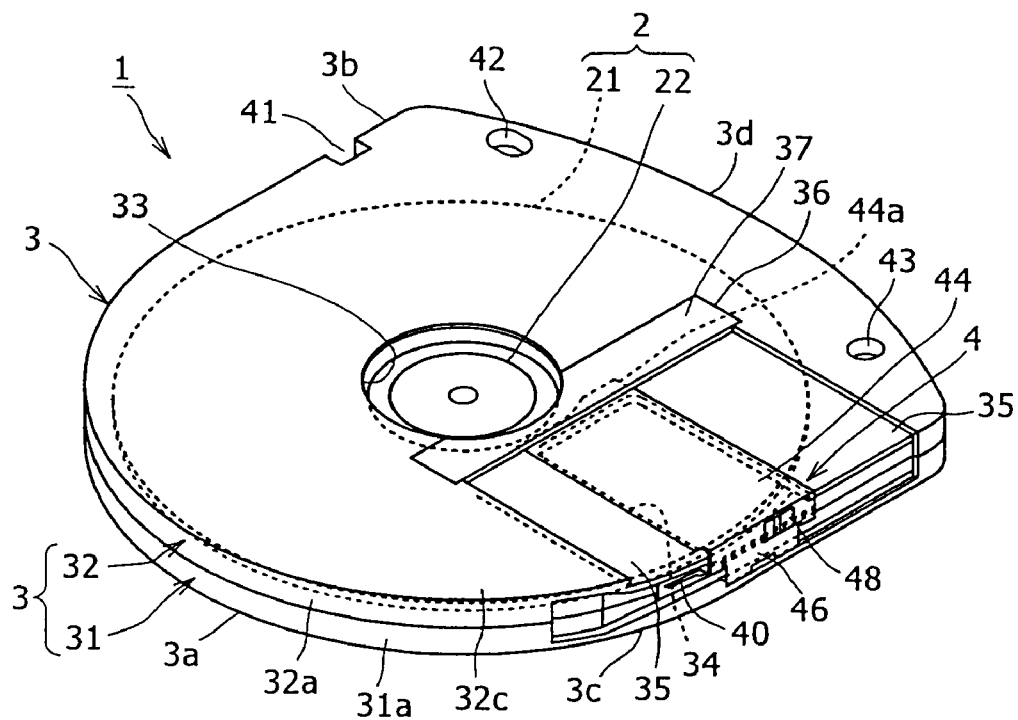
FIG. 10 is a perspective view showing the disk cartridge, as viewed from a backside thereof (with the shutter closed)
Figure 11:
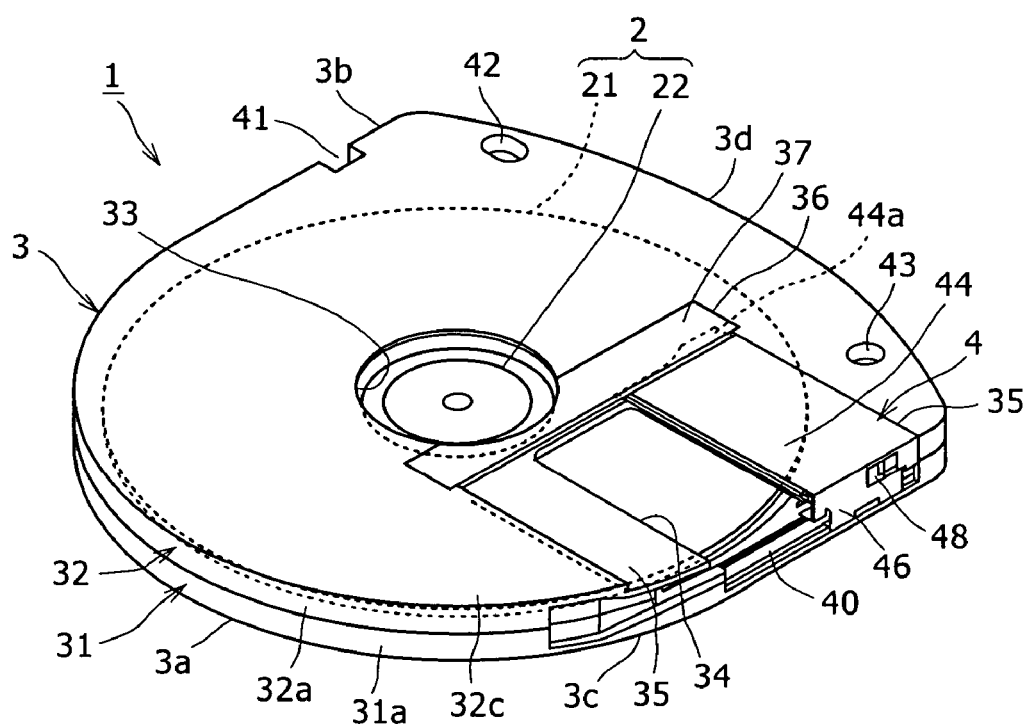
FIG. 11 is a perspective view showing the disk cartridge, as viewed from the backside thereof (with the shutter opened)

FIG. 9 is a perspective view showing the disk cartridge 1 as viewed from an upper half side thereof. FIG. 10 is a perspective view showing the disk cartridge 1, as viewed from a lower half side thereof. FIG. 11 is a perspective view showing the disk cartridge 1 with a shutter member slid to open a recording and/or reproducing opening portion.

The disk cartridge 1 includes a disk recording medium 2, the cartridge main body 3, a shutter member 4, a shutter movement restricting member 5 (see FIG. 14), an urge member 6, and a deformation preventive portion 7. The cartridge main body 3 accommodates the disk recording medium 2 rotatably in a disk storage portion. The cartridge main body 3 also includes a recording and/or reproducing opening portion 34 that makes part of the disk recording medium 2 face externally. The shutter member 4 is mounted on the cartridge main body 3 so as to be movable across a first position, at which the recording and/or reproducing opening portion 34 is closed, and a second position, at which the recording and/or reproducing opening portion 34 is open. The shutter movement restricting member 5 engages a movement restricting portion 3*e* disposed on the cartridge main body 3 when the shutter member 4 is located at the first position of closing the recording and/or reproducing opening portion 34. The shutter movement restricting member 5 thereby restricts the shutter member 4 from moving in a direction of opening the recording and/or reproducing opening portion 34. The urge member 6 urges the shutter movement restricting member 5 in a direction of making the shutter movement restricting member 5 engaged with the movement restricting portion 3*e* disposed on the cartridge main body 3. The deformation preventive portion 7 prevents the urge member 6 from being deformed by an external force.

The urge member 6 includes an extension flap 6*a* and an elastic displacement flap 6*c*. The extension flap 6*a* is extended from one side of the shutter member 4. The elastic displacement flap 6*c* is formed by folding back the extension flap 6*a* via a fold back portion 6*b* disposed at a leading end portion of the extension flap 6*a* so as to overlap an inside of the extension flap 6*a*.

The deformation preventive portion 7 is disposed on a back of the leading end portion of the urge member 6. The deformation preventive portion 7 thereby supports the urge member 6 from the backside, thus preventing the urge member 6 from being deformed by an external force.

Figure 12:
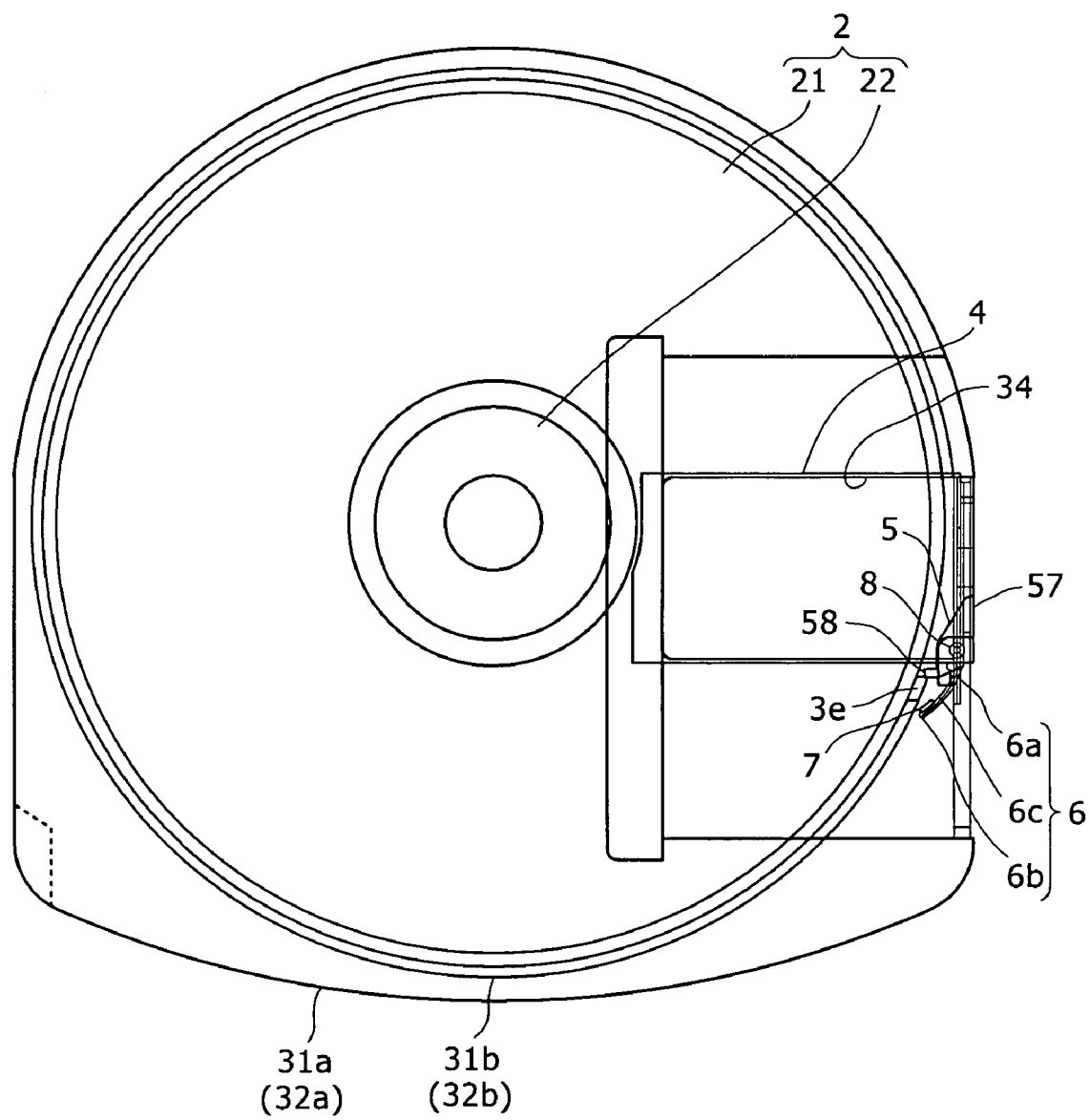
FIG. 12 is a plan view showing a condition, in which the shutter is locked.
Figure 13:
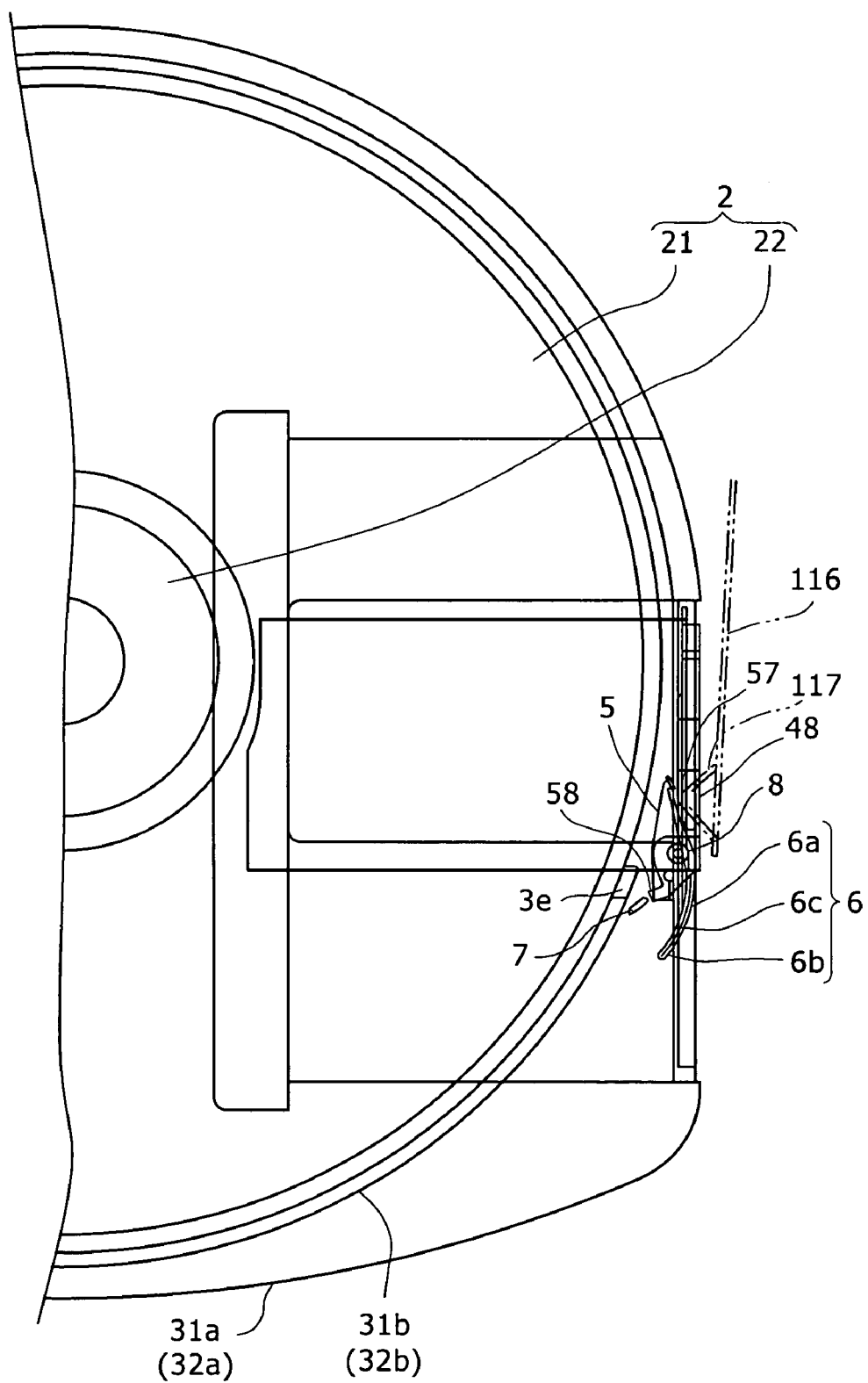
FIG. 13 is a plan view showing a condition, in which the shutter is unlocked.

Reference is now made to FIG. 12. In a condition, in which the shutter member 4 closes the recording and/or reproducing opening portion 34, the urge member 6 presses, with the leading end portion of the elastic displacement flap 6*c*, a pressed portion 57 disposed on the side of one end of the shutter movement restricting member 5. The urge member 6 thereby rotates the shutter movement restricting member 5 clockwise about a mounting shaft 8. An engagement portion 58 disposed on the side of the other end of the shutter movement restricting member 5 is thereby located at a position to be engaged relative to the movement restricting portion 3*e* disposed on the cartridge main body 3. If an attempt is made, in this condition, to move the shutter member 4 in a direction of opening the recording and/or reproducing opening portion 34, the engagement portion 58 disposed on the other end of the shutter movement restricting member 5 engages the movement restricting portion 3*e* disposed on the cartridge main body 3, thereby inhibiting the shutter member 4 from moving. Reference is now made to FIG. 13. If the pressed portion 57 is pressed with a protruded portion 117 included in a lock release member disposed on one side surface of the cartridge holder 102 to be described next, while counteracting an urging force of the elastic displacement flap 6*c*, the shutter movement restricting member 5 is rotated counterclockwise about the mounting shaft 8. The engagement portion 58 is thus allowed to escape to a position that disables engagement of the engagement portion 58 relative to the movement restricting portion 3e. The shutter member 4 is thus allowed to move in the direction of opening the recording and/or reproducing opening portion 34.

The disk recording medium 2, the cartridge main body 3, the shutter member 4, the shutter movement restricting member 5, the urge member 6, and the deformation preventive portion 7 will be described in detail.

Referring to FIG. 9, the disk recording medium 2 is formed by mounting a chucking hub 22 at a central portion of an optical disk 21, on which game software or the like has been recorded. The optical disk 21 is formed to have a small diameter of about 50 mm. The chucking hub 22 is formed from a magnetic metal, such as a stainless steel, attracted by a magnet.

The cartridge main body 3 is formed by abutting peripheral walls 31a, 32a of an upper half 31 and a lower half 32. Referring to FIG. 12, arcuate ribs 31b, 32b forming the disk storage portion are disposed on insides of the peripheral walls 31a, 32a.

Referring to FIG. 11, the front surface 3a (a side surface on the side of an insertion end into the disk recording and/or reproducing apparatus to be described later) of the cartridge main body 3 is formed into an arcuate surface (a semi-circular surface) having substantially the same curvature radius as the optical disk 21. Right and left side surfaces 3b, 3c that continue from the front surface 3a are formed into flat surfaces running in parallel with each other. A back surface 3d opposing the front surface 3a is formed into a curved surface that continues smoothly from the right and left side surfaces 3b, 3c.

There is disposed at a central portion of the lower half 32 a driving opening portion 33 that makes the hub 22 of the disk recording medium 2 face externally. Further the recording and/or reproducing opening portion 34 that makes an information recording surface of the optical disk 21 of the disk recording medium 2 face externally is formed over an area extending from a point near the driving opening portion 33 to the side surface 3c on one side.

The hub 22 of the disk recording medium 2 is magnetically clamped onto a disk table of the disk recording and/or reproducing apparatus via the driving opening portion 33. An optical pickup of the disk recording and/or reproducing apparatus records and/or reproduces information relative to the optical disk 21 of the disk recording medium 2 via the recording and/or reproducing opening portion 34.

A recessed step portion (hereinafter referred to as a first recessed portion) 35 is disposed in an area from an outer surface 32c of the lower half 32 to the peripheral wall of the side surface 3c. The first recessed portion 35 functions to ensure that the shutter member 4 to be described next is mounted so as not to protrude from an outer surface 32b of the lower half 32 and the side surface 3c. More specifically, the first recessed portion 35 ensures that the shutter member 4 is mounted flush with the outer surface 32c of the lower half 32 and an outer surface of the peripheral wall on the side of the side surface 3c. In addition, the first recessed portion 35 functions to restrict a range of movement of the shutter member 4.

An end portion of the first recessed portion 35 adjacent to the driving opening portion 33 is a second recessed portion 36 that is deeper than the first recessed portion 35. A folded portion 44a disposed on a leading end of an opening open/close portion 44 of the shutter member 4 to be described next is inserted into the second recessed portion 36. A shutter guide plate 37 attached to the lower half 32 blocks up the second recessed portion 36 at an area upward of the folded portion 44a. The shutter guide plate 37 prevents the folded portion 44a on the leading end of the opening open/close portion 44 from riding up. The shutter guide plate 37 is also mounted on the lower half 32 in a condition, in which the shutter guide plate 37 remains flush with an outer surface of the lower half 32.

Figure 14:
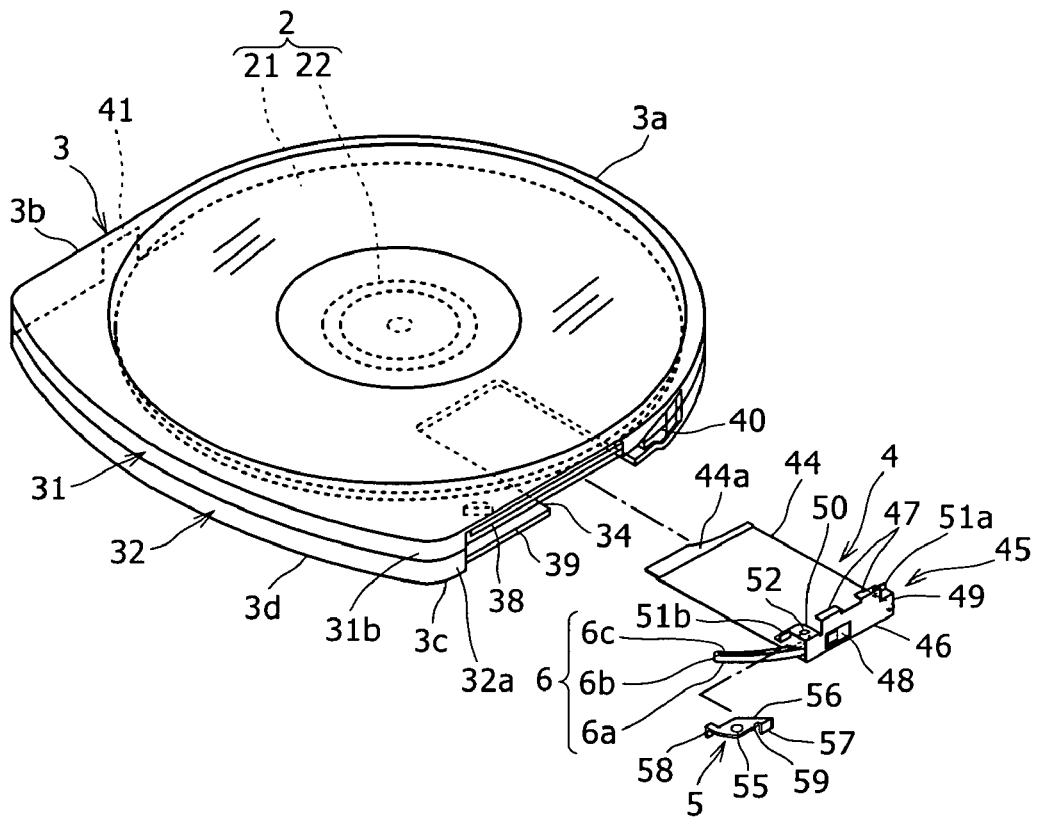
FIG. 14 is an exploded perspective view showing a condition, in which the shutter is mounted.

Referring to FIG. 14, the upper half 31 includes a guide groove 38 extending in a direction of movement of the shutter member 4 in the peripheral wall 31a on the side of the side surface 3c. The peripheral wall 32a on the side of the side surface 3c of the lower half 32 is removed. There is formed an opening portion 39 for guiding the shutter member in a space from the peripheral wall 31a on the side of the side surface 3c of the upper half 31.

A lock release member introduction groove 40 that continues into the opening portion 39 for guiding the shutter member is formed from the side surface 3c to the front surface 3a of the cartridge main body 3. In addition, a function enhancement groove 41 is disposed on the other side surface 3d of the cartridge main body 3. Referring to FIG. 11, a pair of positioning holes 42, 43 is disposed on an outer surface of the lower half 32 on the side of the front surface 3a.

Referring to FIG. 14, the shutter member 4 includes the opening open/close portion 44 and an assembly portion 45. The opening open/close portion 44 is a flat plate that opens or closes the recording and/or reproducing opening portion 34. The assembly portion 45 is for assembling the cartridge main body 3 such that the cartridge main body 3 can move across the first position, at which the recording and/or reproducing opening portion 34 is closed, and the second position, at which the recording and/or reproducing opening portion 34 is open, with the opening open/close portion 44 overlapped with the first recessed portion 35 of the lower half 32.

The assembly portion 45 includes a first movement guide flap 46 and a second movement guide flap 47. The first movement guide flap 46 is formed by bending the side of one end of the opening open/close portion 44 substantially at a right angle. The second movement guide flap 47 is formed by bending a leading end portion of the first movement guide flap 46 substantially at a right angle so as to run in the same direction as the opening open/close portion 44.

The first movement guide flap 46 includes an opening portion 48 for pressing operation at a central portion thereof. The pressed portion 57 of the shutter movement restricting member 5 to be next described in detail faces this opening portion 48. The first movement guide flap 46 also includes third and fourth movement guide flaps 49, 50 disposed on both sides in the shutter movement direction and at substantially a central portion in a width direction of the cartridge main body 3. The third and fourth movement guide flaps 49, 50 run substantially in parallel with the second movement guide flap 47. The third and fourth movement guide flaps 49, 50 also include lock tabs 51a, 51b at leading end portions thereof, respectively. The lock tabs 51a, 51b extend in a direction of leaving away from the opening open/close portion 44. There is disposed a boss-shaped shaft portion 52 on a lower surface of the fourth movement guide flap 50. The shaft portion 52 allows the shutter movement restricting member 5 to be mounted rotatably. An end portion of the opening open/close portion 44 opposite to the assembly portion 45 includes the folded portion 44a for preventing riding up. The shutter member 4 is formed by bending a metal plate blanked to a predetermined shape.

Figure 16:
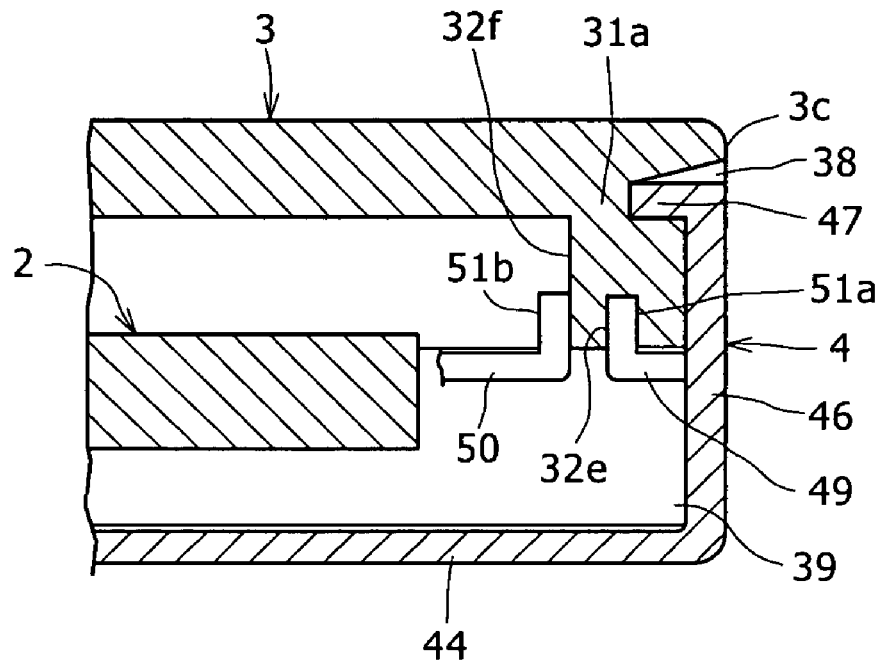
FIG. 16 is a cross sectional view showing a condition, in which the shutter is mounted.

Referring to FIG. 16, the shutter member 4 is slidably mounted in the side surface 3c of the cartridge main body 3 as detailed in the following. Specifically, the first movement guide flap 46 is overlapped with the lock release member introduction groove 40 in the side surface 3c of the cartridge main body 3. The second movement guide flap 47 is then inserted into the guide groove 38 included in the upper half 31. The third and fourth movement guide flaps 49, 50 are inserted into the cartridge main body 3 through the opening portion 39 for guiding the shutter member. The lock tab 51a disposed on the leading end of the third movement guide flap 49 is then engaged with a groove 32e included in a bottom surface of the peripheral wall 31a of the upper half 31. The lock tab 51b disposed on the leading end of the fourth movement guide flap 50 is engaged with an inner surface 32f of the peripheral wall 31a of the upper half 31.

The shutter member 4 achieves the following functions. Specifically, referring to FIG. 10, when the opening open/close portion 44 is slid toward the side of the front surface 3a of the cartridge main body 3, the recording and/or reproducing opening portion 34 is thereby closed. Referring now to FIG. 11, when the opening open/close portion 44 is slid toward the side of the back surface 3d of the cartridge main body 3, the recording and/or reproducing opening portion 34 is thereby opened.

Figure 15:
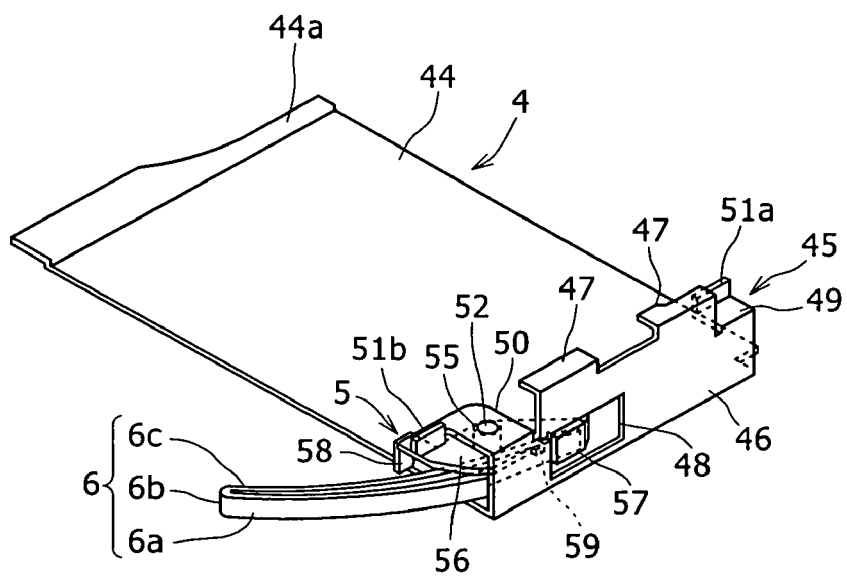
FIG. 15 is a perspective view showing a condition, in which a shutter movement restricting member is mounted on the shutter.

Reference is now made to FIGS. 14 and 15. The shutter movement restricting member 5 includes a flat plate main body portion 56, the pressed portion 57, and the engagement portion 58. The main body portion 56 includes a bearing hole 55 located at a central portion thereof. The pressed portion 57 is located at one end portion of the main body portion 56. The engagement portion 58 is located at the other end portion of the main body portion 56. The shutter movement restricting member 5 further includes a protruded portion 59 for inhibiting rotation disposed on the end portion thereof, in which the pressed portion 57 is provided. The pressed portion 57 and the engagement portion 58 are formed by bending one end portion and the other end portion of the main body portion 56 substantially at a right angle in the same direction. The shutter movement restricting member 5 is formed by bending a metal plate blanked to a predetermined shape.

The shutter movement restricting member 5 is rotatably mounted in the fourth movement guide flap 50 by inserting the boss-shaped shaft portion 52 on the fourth movement guide flap 50 of the shutter member 4 in the bearing hole 55. When the shutter movement restricting member 5 is rotated until the protruded portion 59 for inhibiting rotation abuts on the inner surface of the first movement guide flap 46 of the shutter member 4, the pressed portion 57 faces the opening portion 48 for pressing operation disposed at the central portion of the first movement guide flap 46 of the shutter member 4 as shown in FIG. 11. At the same time, referring to FIG. 12, the engagement portion 58 becomes engageable with the movement restricting portion 3e disposed on the cartridge main body 3, thus inhibiting the shutter member 4 from moving.

As described earlier, the urge member 6 includes the extension flap 6a and the elastic displacement flap 6c. The extension flap 6a is extended from one side of the shutter member 4. The elastic displacement flap 6c is formed by folding back the extension flap 6a via the fold back portion 6b disposed at the leading end portion of the extension flap 6a. (See FIG. 14.) The extension flap 6a is formed by being curved so as to enter the cartridge main body 3 through the opening portion 39 for guiding the shutter member when the shutter member 4 is assembled in the cartridge main body 3. The elastic displacement flap 6c is folded back in a curved condition so as to overlap the inner surface of the extension flap 6a. The leading end portion of the elastic displacement flap 6c is to press the pressed portion 57 disposed on the side of one end of the shutter movement restricting member 5, thus causing the pressed portion 57 to face the opening portion 48 for pressing operation disposed at the central portion of the first movement guide flap 46 of the shutter member 4. The extension flap 6a makes long the elastic displacement flap 6c, thereby allowing spring constant of the urge member 6 to be adjusted.

Figure 17:
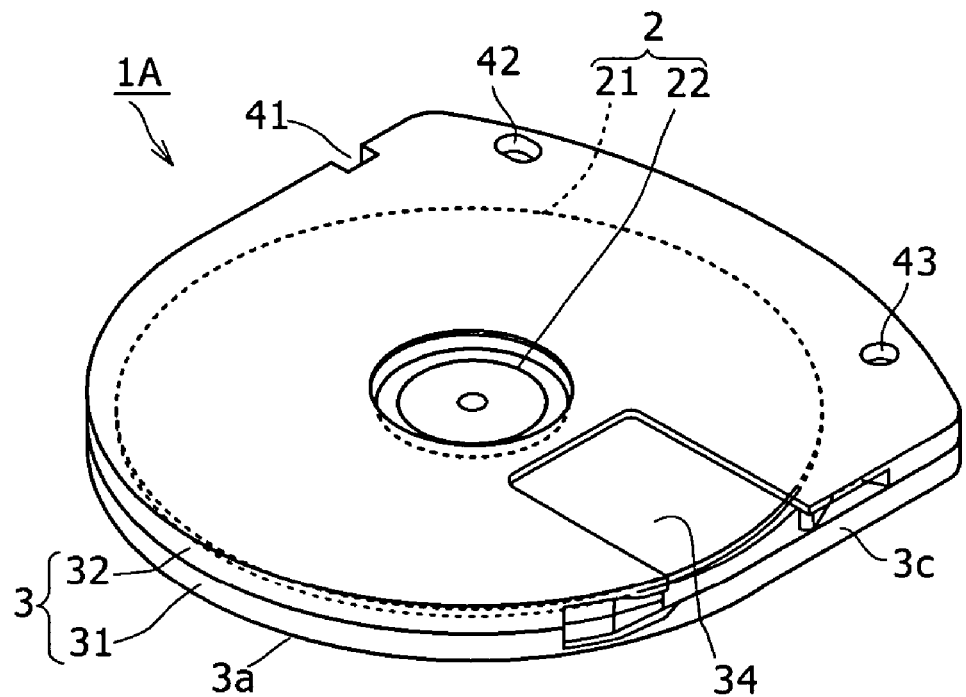
FIG. 17 is a perspective view showing the disk cartridge having no shutters.

FIG. 17 is a view showing a disk cartridge according to another embodiment of the present invention. According to this embodiment of the present invention, a disk cartridge 1A does not include a shutter member 4. This embodiment is identical to the disk cartridge 1 including the shutter member 4 described heretofore in the rest of the structures and the same description is not repeated.

(3) Structure of Cartridge Holder

Referring to FIG. 3, the cartridge holder 102 includes an upper surface plate (top surface plate) 102a, right and left side surface plates (hereinafter referred to as first and second side surface plates) 102b, 102c, a pair of right and left cartridge support portions 102d, 102e, and receiving surface portions 102f, 102g. The upper surface plate 102a is substantially a square. The first and second side surface plates 102b, 102c are formed by bending right and left side portions of the upper surface plate 102a downwardly substantially at a right angle. The cartridge support portions 102d, 102e are formed by bending lower ends of the first and second side surface plates 102b, 102c inwardly substantially at a right angle. The cartridge support portions 102d, 102e support right and left side portions on the lower surface of the disk cartridge 1 inserted in the cartridge holder 102. The receiving surface portions 102f, 102g are formed by bending front ends of the cartridge support portions 102d, 102e downwardly. The upper surface plate 102a, the first and second side surface plates 102b, 102c, the pair of right and left cartridge support portions 102d, 102e, and the like constitute an insertion port and storage portion 102k of the disk cartridge 1. A bridge plate 102m is attached at a position closer to the insertion port of the pair of right and left cartridge support portions 102d, 102e. The bridge plate 102m is attached so as to cross over the cartridge support portions 102d, 102e. The bridge plate 102m serves as reinforcement for preventing the pair of cartridge support portions 102d, 102e from being easily deformed. The bridge plate 102m also functions to prevent the disk cartridge 1 from jumping out from a space between the pair of cartridge support portions 102d, 102e.

The upper surface plate 102a has a hexagonal opening portion 111 blanked at a center thereof. The opening portion 111 is for reducing weight of the cartridge holder 102.

A pair of right and left, or first and second flat springs 112, 113 is disposed on both sides of the opening portion 111. The first and second flat springs 112, 113 are bent so as to advance into the storage portion 102k. The first and second flat springs 112, 113 are designed to press an upper surface of the disk cartridge 1 inserted into the storage portion 102k, thereby pressing the disk cartridge 1 against the cartridge support portions 102d, 102e. In addition, a pair of right and left, or third and fourth flat springs 114, 115 is disposed on the side of a front end of the opening portion 111. The third and fourth flat springs 114, 115 are bent upwardly toward an upper side of the upper surface plate 102a. The third and fourth flat springs 114, 115 are designed to permit easy insertion, assembly, or a related task performed for the cartridge holder 102 relative to a cartridge holder storage portion or the like of an electronic apparatus. The first through fourth flat springs 112 to 115 are formed by blanking part of the upper surface plate 102a of the disk cartridge 1.

The recessed lock release means mounting portion 102h is formed in the following space. The space is specifically between the second flat spring 113 and the second side surface plate 102c of the cartridge holder 102, and between the arcuate front surface 3a of the disk cartridge 1 inserted in the cartridge holder 102 and the second side surface plate 102c of the cartridge holder 102. The space is what is called a dead space. Referring to FIG. 5, two cylindrical boss-shaped protrusions 102n are formed on the second side surface plate 102c of the cartridge holder 102 facing the lock release means mounting portion 102h. The lock release means 108 is mounted through the following mounting steps in the substantially triangular dead space formed by the disk cartridge 1 inserted in the cartridge holder 102, and the arcuate front surface 3a and the side surface 3c of the cartridge main body 3. Specifically, the boss-shaped protrusions 102n are inserted in protrusion fitting holes 108g in the mounting portion 108a. The overlapping portion 108b is overlapped with the upper surface of the lock release means mounting portion 102h. The elastic flap portion 108c and the eject lever operating portion 108d are then inserted in the cartridge holder 102 and leading end portions of the boss-shaped protrusions 102n are then caulked to enlarge diameters thereof.

As shown in FIG. 3, the second side surface plate 102c of the cartridge holder 102 is mounted with a lock release member 116 for releasing locking of the shutter member 4 by the shutter movement restricting member 5 of the disk cartridge 1.

The lock release member 116 is formed from a flat spring material. Like the mounting portion 108a of the lock release means 108, the lock release member 116 is immovably attached to second side surface plate 102c of the cartridge holder 102. The side on one end portion of the lock release member 116 in a length direction is secured by the boss-shaped protrusions 102n disposed on the second side surface plate 102c of the cartridge holder 102. The lock release member 116 extends along the second side surface plate 102c of the cartridge holder 102 up to a point near the cartridge insertion port. A protruded portion 117 substantially having a V shape in a plan view is disposed on a leading end portion of the lock release member 116. The protruded portion 117 advances into the cartridge holder 102 through a cutout window 118 provided in the second side surface plate 102c of the cartridge holder 102. Referring to FIG. 13, when the disk cartridge 1 is inserted into the cartridge holder 102, the protruded portion 117 at the leading end of the lock release member 116 presses the pressed portion 57 of the shutter movement restricting member 5, thus unlocking the shutter member 4.

The pair of right and left cartridge support portions 102d, 102e of the cartridge holder 102 includes a pair of positioning holes 119. Positioning pins 120 included in the chassis 103 to be described next are inserted in these positioning holes 119.

The first and second side surface plates 102b, 102c of the cartridge holder 102 include bearing holes 121, 122 disposed on an end portion opposite to the cartridge insertion port of the first and second side surface plates 102b, 102c. The bearing holes 121, 122 serve the purpose of mounting the cartridge holder 102 rotatably in the chassis 103 to be described next.

(4) Structure of Chassis

The chassis 103 is formed substantially into a rectangle from a metal plate. The chassis 103 includes damper mounting portions 131 disposed at four corners thereof. Rubber dampers 132 are fitted in these damper mounting portions 131. The chassis 103 includes right and left side walls 133, 134 located outside the first and second side surface plates 102b, 102c, respectively, of the cartridge holder 102. The side walls 133, 134 include a pair of bearing portions 135, 136 for rotatably mounting the cartridge holder 102. The bearing portions 135, 136 are located on the side of one end of the side walls 133, 134. Shafts 137 disposed on inner surfaces of the bearing portions 135, 136 are inserted into the bearing holes 121, 122 in the cartridge holder 102. The cartridge holder 102 is thereby rotatably supported between the cartridge insertion and withdrawal position and the recording and reproducing position.

The chassis 103 includes the positioning pins 120 that fit into the positioning holes 119 included in the right and left cartridge support portions 102d, 102e of the cartridge holder 102 when the cartridge holder 102 is moved to the recording and reproducing position.

(5) Structure of Recording and/or Reproducing Means

Referring to FIG. 3, the recording and/or reproducing means 104 includes a spindle motor 151, an optical pickup 152, and a sled motor 153. The spindle motor 151 rotates the disk recording medium 2 of the disk cartridge 1. The optical pickup 152 records and/or reproduces information to and from the disk recording medium 2. The sled motor 153 drives the optical pickup 152.

Figure 18:
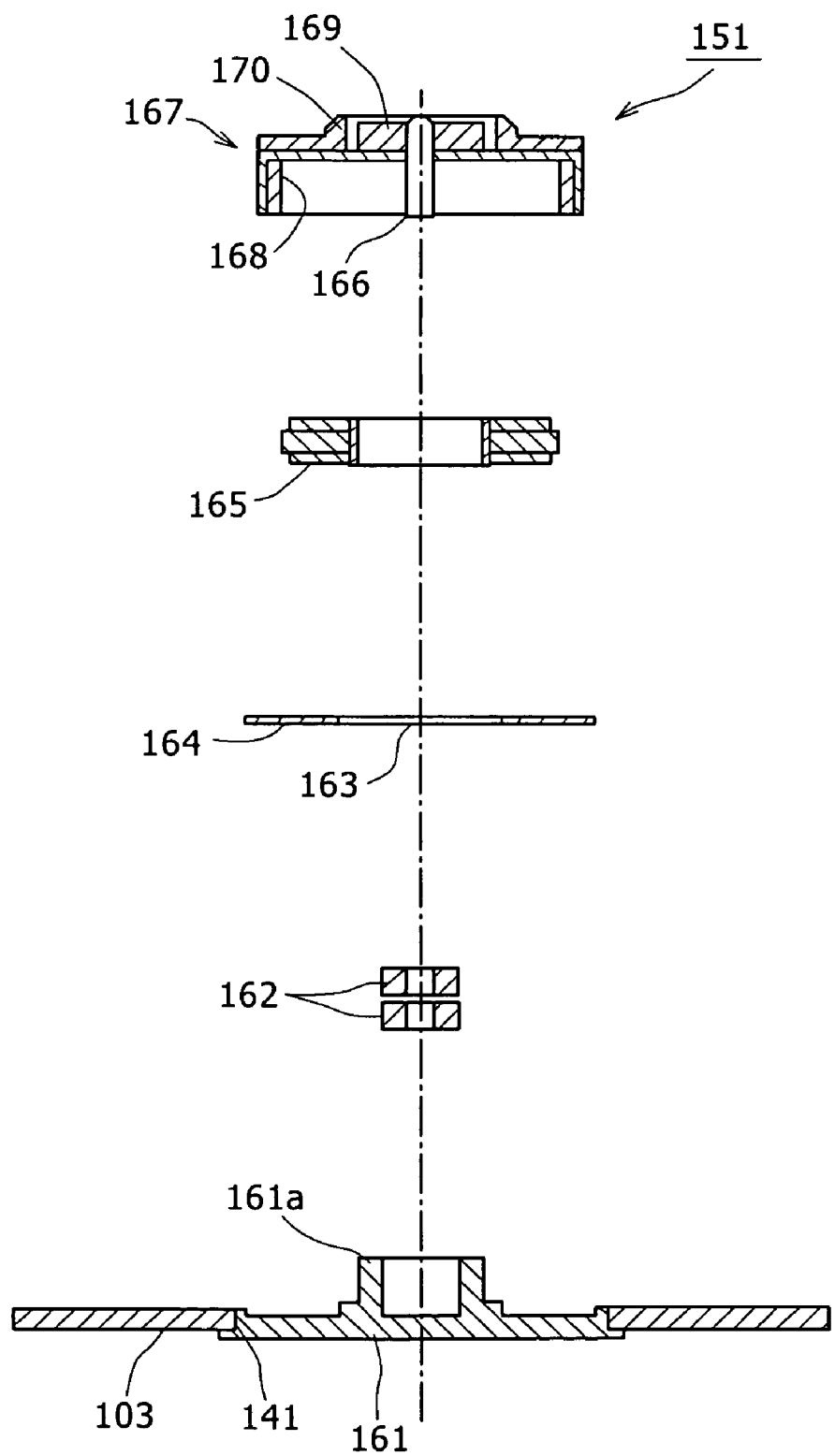
FIG. 18 is a cross sectional view showing steps for assembling a spindle motor.

Referring to FIG. 18, the spindle motor 151 includes a stator board 161, a bearing portion 161a, a bearing 162, a wiring board 164, an iron core coil 165, and a rotor assembly 167. The stator board 161 is a synthetic resin outsert-molded in a stator board forming hole 141 for the spindle motor (hereinafter referred to as a first stator board forming hole) provided in the chassis 103. The bearing portion 161a is a tubular element integrally molded on an upper surface of the stator board 161. The bearing 162 is mounted in an inner periphery of the bearing portion 161a. The wiring board 164 is placed and held on the stator board 161 with the tubular bearing portion 161a inserted in a central hole 163. The iron core coil 165 is mounted on an outer peripheral portion of the tubular bearing portion 161a. The rotor assembly 167 is rotatably mounted with a leading end of a rotational central shaft 166 inserted in the bearing 162. A rotor magnet 168 paired with the iron core coil 165 is mounted on an inner peripheral surface of the rotor assembly 167. A disk table 170 is mounted on an upper surface of the rotor assembly 167. The disk table 170 uses a chucking magnet 169 for magnetically clamping the hub 22 of the disk recording medium 2.

Referring to FIG. 3, the optical pickup 152 includes an objective lens driving device 171 and a carrier rack 172. The carrier rack 172 moves the objective lens driving device 171 in a radial direction of the disk recording medium 2.

The carrier rack 172 includes a first bearing portion 173 and a second bearing portion 174. The first bearing portion 173 is mounted with a lead screw 175. The second bearing portion 174 includes a guide portion 176.

The lead screw 175 is rotatably supported by a pair of bearings 177 on the side of a lower surface of the chassis 103. The guide portion 176 is integrally formed with the chassis 103 through outsert molding.

A worm gear 181 is mounted on one end of the lead screw 175. Referring to FIG. 2, the worm gear 181 is in mesh with a third gear 183 rotatably mounted through a shaft 182 on the lower surface of the chassis 103.

The third gear 183 includes a second gear 184 disposed on a lower end portion thereof and mounted coaxially therewith. The second gear 184 has a larger diameter than the third gear 183. The second gear 184 is rotatably driven by the sled motor 153 through a first gear 185 to be described next.

Figure 19:
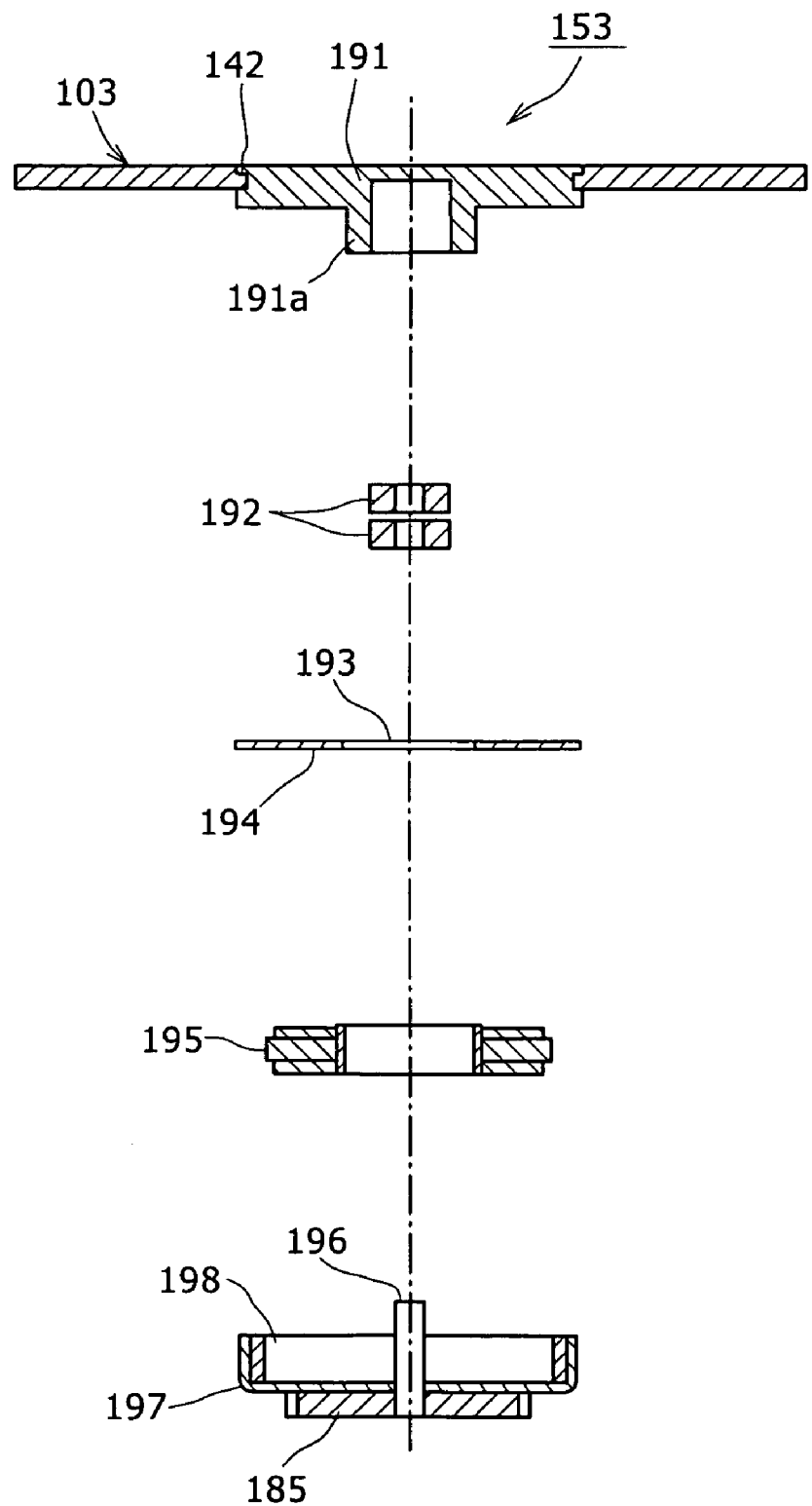
FIG. 19 is a cross sectional view showing steps for assembling a sled motor.

Referring to FIG. 19, the sled motor 153 includes a stator board 191, a bearing portion 191a, a bearing 192, a wiring board 194, an iron core coil 195, and a rotor assembly 197.

The stator board 191 is a synthetic resin outsert-molded in a stator board forming hole 142 for the sled motor (hereinafter referred to as a second stator board forming hole) provided in the chassis 103. The bearing portion 191a is a tubular element integrally molded on an upper surface of the stator board 191. The bearing 192 is mounted in an inner periphery of the bearing portion 191a. The wiring board 194 is placed and held on the stator board 191 with the tubular bearing portion 191a inserted in a central hole 193. The iron core coil 195 is mounted on an outer peripheral portion of the tubular bearing portion 191a. The rotor assembly 197 is rotatably mounted with a leading end of a rotational central shaft 196 inserted in the bearing 192. A rotor magnet 198 paired with the iron core coil 195 is mounted on an inner peripheral surface of the rotor assembly 197. In addition, the first gear 185 is mounted on the lower surface of the rotor assembly 197.

Reference is now made to FIG. 2. When the sled motor 153 rotates the lead screw 175 through the first gear 185, the second gear 184, the third gear 183, and the worm gear 181, the carrier rack 172 is guided by the guide portion 176 and moved in a pickup disposition hole 143. The carrier rack 172 thereby moves the objective lens driving device 171 in the radial direction of the disk recording medium 2.

(6) Structure of Eject Lever

When the disk cartridge 1 is inserted, the eject lever 105 is pushed by the front surface 3a of the cartridge main body 3, counteracting the urging force of the urge means 106 to be described next to rotate. The eject lever 105 is then locked by the eject lever lock means 107 to be described later so as not to be rotated backward. After recording and/or reproducing has been completed, the lock release means 108 described earlier releases locking of the eject lever 105 by the eject lever lock means 107. This causes the eject lever 105 to be rotated backward by the urging force of the urge means 106, which unloads the disk cartridge 1 from the cartridge holder 102.

Referring to FIG. 3, the eject lever 105 includes a substantially V-shaped flatly formed main portion 105a, a pressed portion 105c, a bearing hole 105d, and the operated portion 105e. The flatly formed main portion 105a is to be overlapped with the upper surface of the chassis 103. The pressed portion 105c is disposed on the side of one end of the flatly formed main portion 105a via an arm portion 105b. The pressed portion 105c is pressed by the front surface 3a of the cartridge main body 3. The bearing hole 105d is disposed on the side of the other end of the flatly formed main portion 105a. The operated portion 105e is disposed at a position substantially symmetrical with respect to the pressed portion 105c across the bearing hole 105d. The operated portion 105e is operated for releasing locking by the eject lever operating portion 108d of the lock release means 108.

The eject lever 105 is mounted on the upper surface of the chassis 103 rotatably by a shaft 105f. A central portion of the front surface 3a of the cartridge main body 3 of the disk cartridge 1 inserted into the cartridge holder 102 is to abut against the pressed portion 105c. In addition, the eject lever 105 is mounted on the upper surface of the chassis 103 such that the flatly formed main portion 105a is raised by the shaft 105f to a position, at which locking by the eject lever lock means 107 can be released.

Figure 8A:
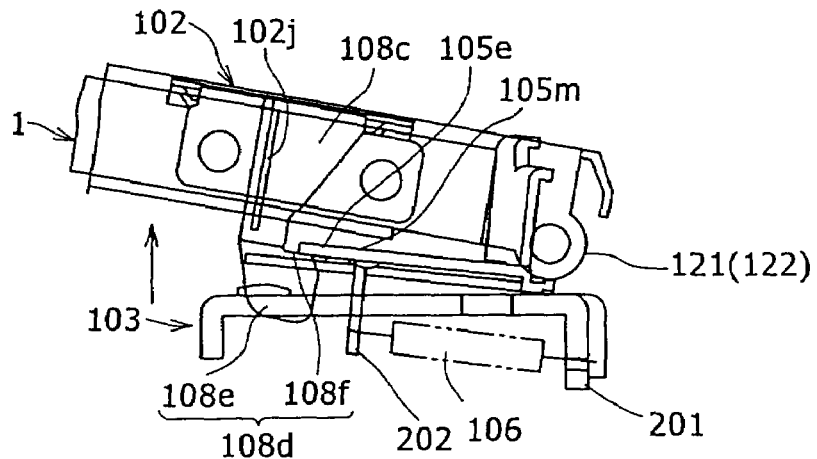
FIG. 8A is a side elevational view showing a condition, in which the engagement portion raises the lower surface of the operated portion of the eject lever, causing locking of the eject lever by eject lever lock means is released.
Figure 8B:
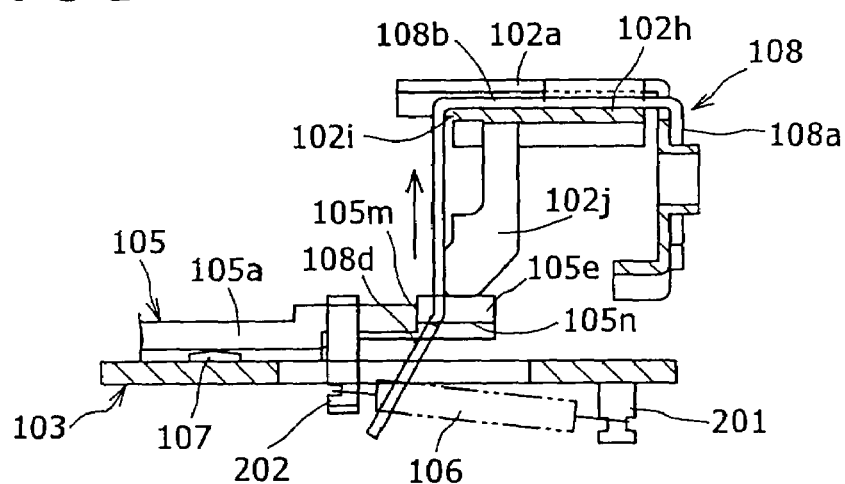
FIG. 8B is a front view showing the same.
Figure 8C:
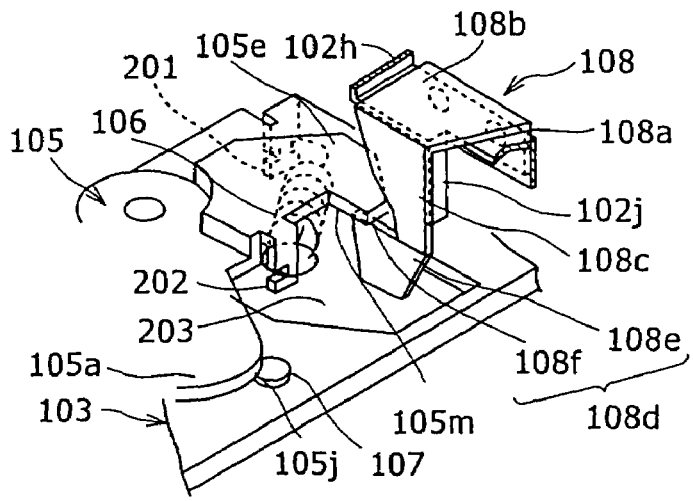
FIG. 8C is a perspective view showing the same.
Figure 20:
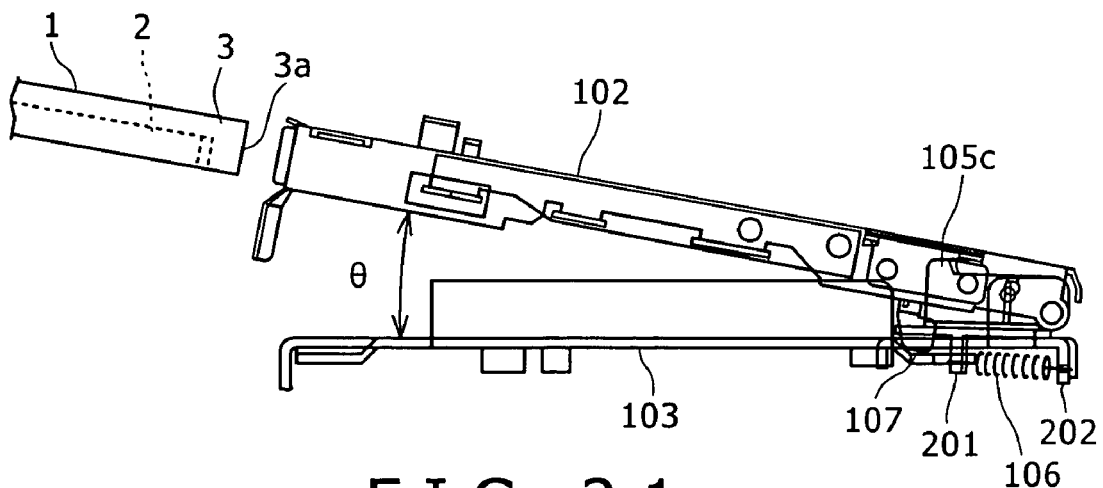
FIG. 20 is a side elevational view showing a condition, in which a cartridge holder is placed at a cartridge insertion and withdrawal position.
Figure 21:
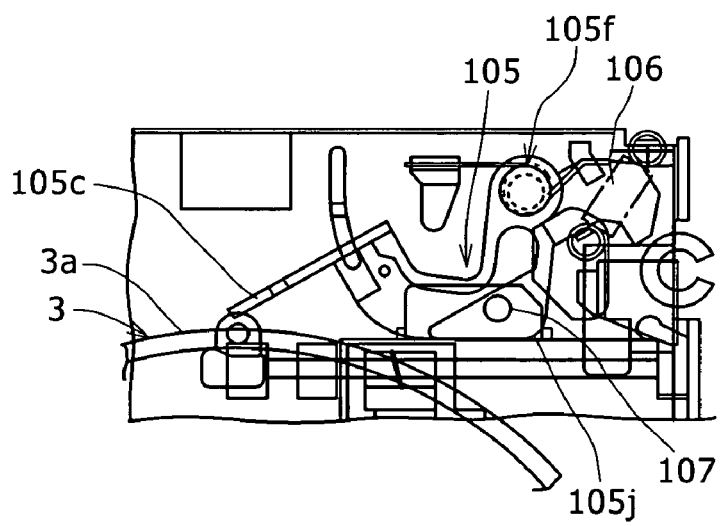
FIG. 21 is a plan view showing a condition before the eject lever is pushed.
Figure 22:
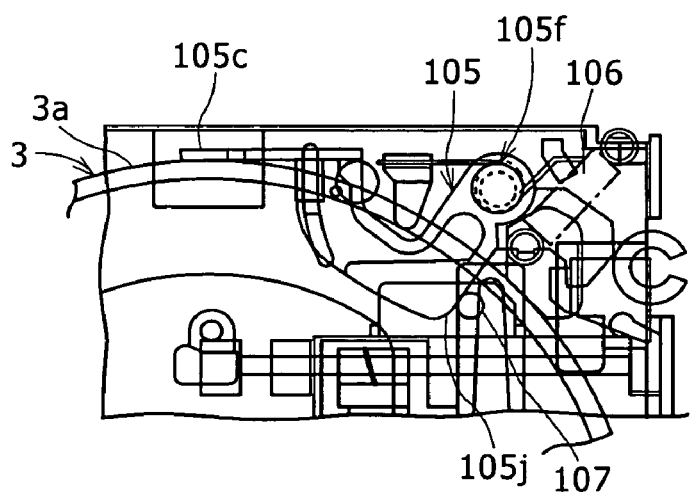
FIG. 22 is a plan view showing a condition after the eject lever is pushed.

The eject lever 105 is constructed as described in the foregoing. When the disk cartridge 1 is inserted in the cartridge holder 102 in the cartridge insertion and withdrawal position (in a condition, in which the cartridge holder 102 is inclined at a predetermined inclined angle θ relative to the chassis 103) as shown in FIG. 20, the front surface 3a of the cartridge main body 3 presses the pressed portion 105c, causing the eject lever 105 to counteract the urging force of the urge means 106 to be described next and rotate as shown in FIG. 21. When the disk cartridge 1 is entirely accommodated in the cartridge holder 102, the eject lever lock means 107 to be described next engages an outer surface 105j of the flatly formed main portion 105a, thus locking the eject lever 105 so as not to be rotated backward as shown in FIG. 22. In this condition, the cartridge holder 102 is kept in a condition of not being able to rotate backward even if the cartridge holder 102 is rotated to the recording and reproducing position. When the cartridge holder 102 is rotated from the recording and reproducing position to the cartridge insertion and withdrawal position after recording and/or reproducing has been completed, the lock release means 108 releases locking of the eject lever 105 by the eject lever lock means 107 as shown in FIGS. 8A, 8B, and 8C. Accordingly, the eject lever 105 is rotated backward by the urging force of the urge means 106, thus unloading the disk cartridge 1 from the cartridge holder 102.

(7) Structure of Urge Means and Eject Lever Lock Means

The urge means 106 gives the eject lever 105 a rotational force in the disk cartridge unloading direction. The urge means 106 also gives an urging force to pull the eject lever 105 in a direction of approaching the chassis 103.

Referring to FIGS. 6A, 6B, 6C, 7A, 7B, 7C, 8A, 8B, and 8C, a coil spring is used for the urge means 106. The urge means 106 is disposed on the side of the lower surface of the chassis 103. One end of the urge means 106 is hooked onto a first spring latch portion 201 disposed in the chassis 103. The other end of the urge means 106 is hooked onto a second spring latch portion 202 disposed in the eject lever 105. The second spring latch portion 202 protrudes downwardly to the side of the lower surface of the chassis 103 through a cutout hole portion 203 included in the chassis 103.

When the eject lever 105 is rotated by counteracting the urge means 106 to a position, in which the disk cartridge 1 is entirely accommodated in the cartridge holder 102, the eject lever lock means 107 engages the outer surface 105j of the flatly formed main portion 105a, thus locking the eject lever 105 so as not to be rotated backward.

The eject lever lock means 107 is formed by disposing a boss-shaped protruded portion on the upper surface of the chassis 103. When the flatly formed main portion 105a of the eject lever 105 is lifted off the chassis 103 by counteracting the urging force of the urge means 106, the eject lever lock means 107 is designed to be disengaged from the outer surface 105j. The eject lever 105, as disengaged from the eject lever lock means 107, rotates with the flatly formed main portion 105a thereof riding on the eject lever lock means 107. The disk cartridge 1 is thereby unloaded from the cartridge holder 102. The lock release means 108 functions to bring the outer surface 105j of the flatly formed main portion 105a of the eject lever 105 into a position, in which the outer surface 105j is lifted off the chassis 103, by overcoming the urging force of the urge means 106.

(8) Miscellaneous Structures

In the exemplary case according to the preferred embodiment of the present invention described in the foregoing, the eject lever 105 is designed to be rotated. An arrangement may nonetheless be possible, in which the eject lever 105 makes a linear motion.

Figure 23:
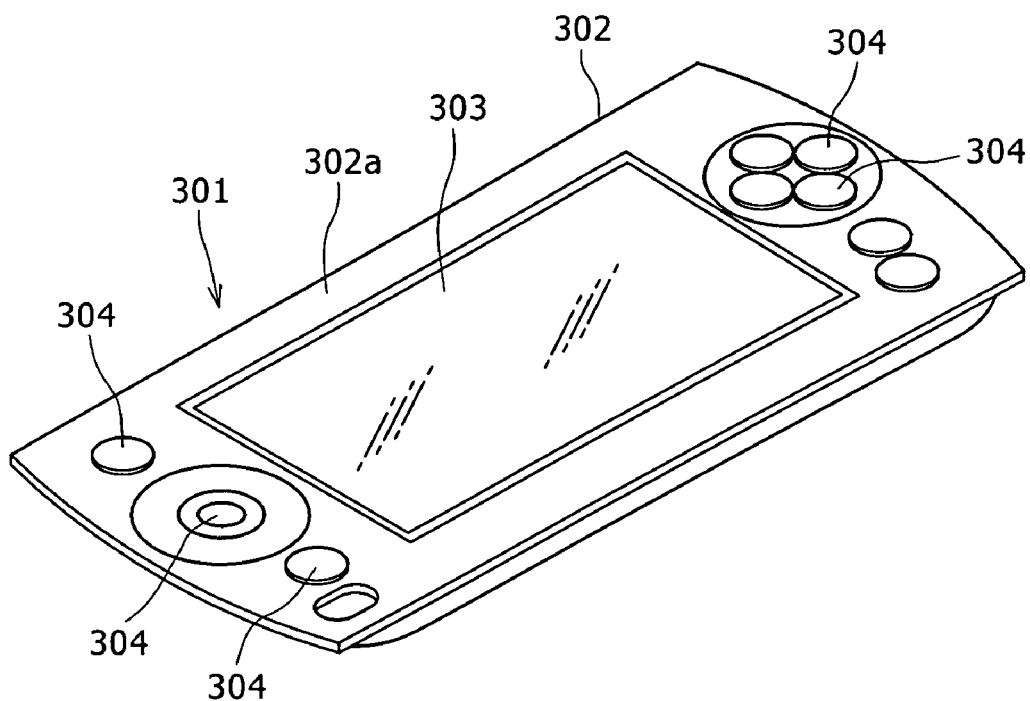
FIG. 23 is a perspective view showing an electronic apparatus.
Figure 24:
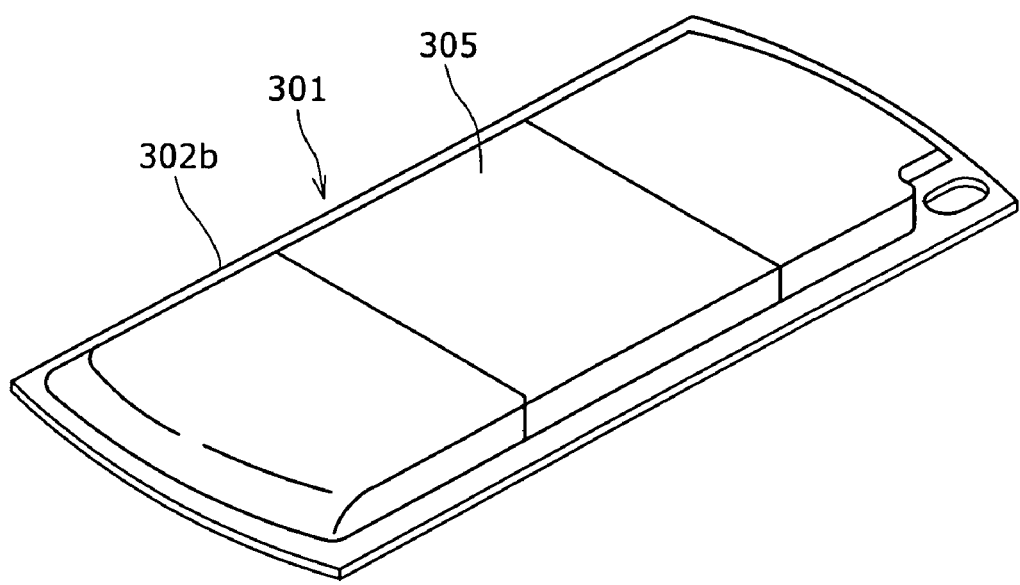
FIG. 24 is a perspective view showing the electronic apparatus, as viewed from a backside thereof.
Figure 25:
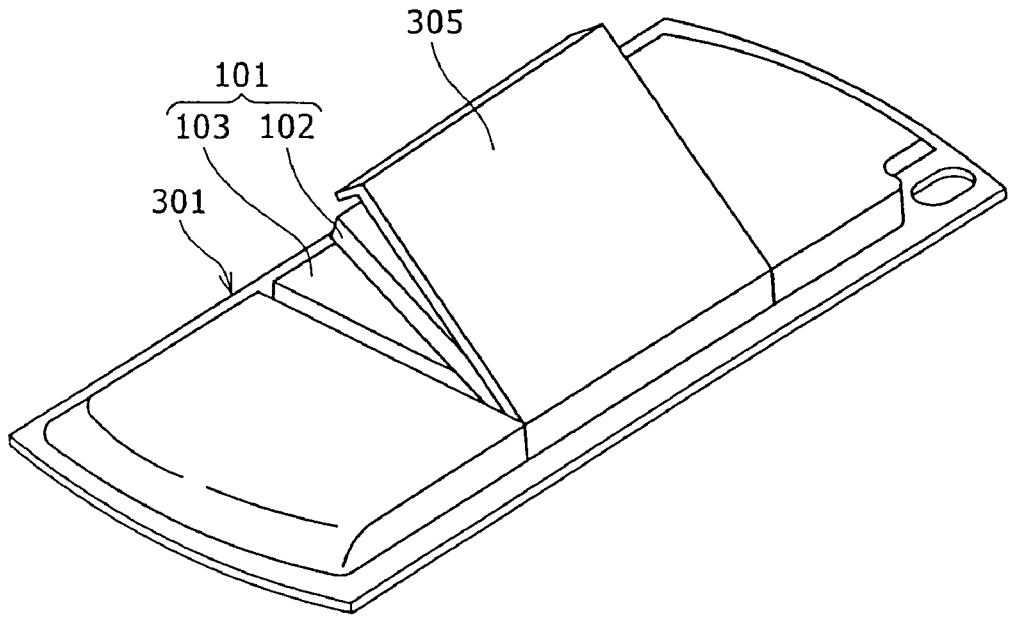
FIG. 25 is a perspective view showing a condition, in which a lid portion is open.
Figure 26:
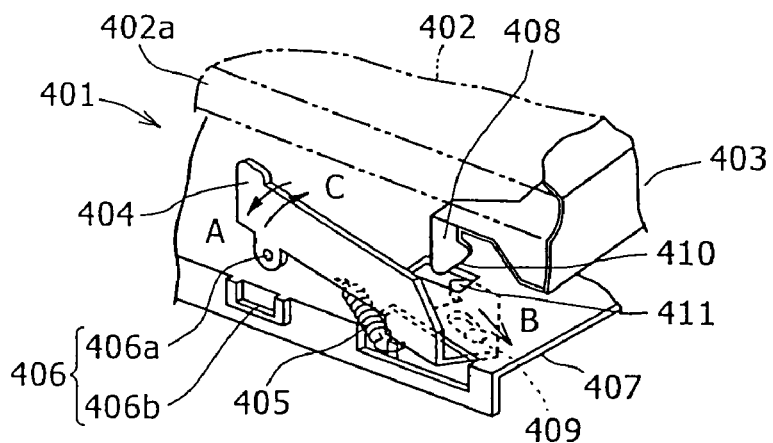
FIG. 26 is a perspective view showing a typical related disk recording and/or reproducing apparatus.
Figure 27:
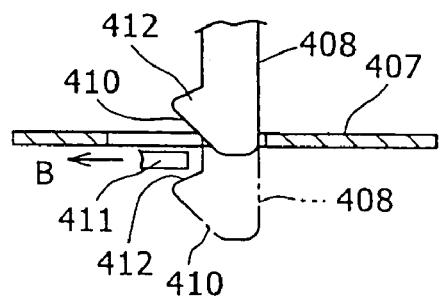
FIG. 27 is a view for explaining the operation of the related disk recording and/or reproducing apparatus.
Figure 28:
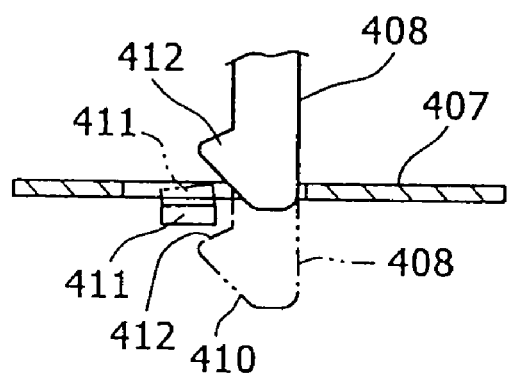
FIG. 28 is a view for explaining the operation of the related disk recording and/or reproducing apparatus.
Figure 29:
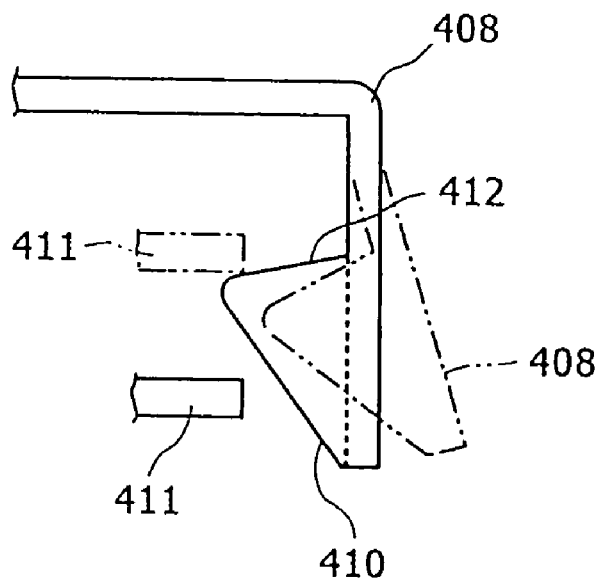
FIG. 29 is a view for explaining the operation of another related disk recording and/or reproducing apparatus.

FIGS. 23 through 25 are views showing an electronic apparatus 301, such as a gaming machine or the like, mounted with the disk recording and/or reproducing apparatus 101 according to the preferred embodiment of the present invention. The electronic apparatus 301 is formed into a flat, horizontally long rectangle. Referring to FIG. 23, a display portion 303, such as liquid crystal or the like, is disposed at a central portion on the side of a front surface 302a of an outer housing 302 of the electronic apparatus 301. A plurality of control keys 304 is disposed on both sides of the electronic apparatus 301. Referring to FIG. 24, a lid portion 305 that can be rotatably opened or closed is disposed at a central portion on the side of a back surface 302b of the outer housing 302 of the electronic apparatus 301. Referring to FIG. 25, the cartridge holder 102 of the disk recording and/or reproducing apparatus 101 is mounted on the lid portion 305. The chassis 103 of the disk recording and/or reproducing apparatus 101 is mounted on the side of the outer housing 302. It is designed that opening the lid portion 305 will rotate and bring the cartridge holder 102 to the cartridge insertion and withdrawal position.

(9) Operation

The disk recording and/or reproducing apparatus 101 according to the preferred embodiment of the present invention is constructed as described in the foregoing. When the lid portion 305 of the electronic apparatus 301 is opened, the cartridge holder 102 follows the movement of the lid portion 305 to be rotated and moved to the cartridge insertion and withdrawal position. If the disk cartridge 1 is inserted into the cartridge holder 102 positioned at the cartridge insertion and withdrawal position, the central portion of the front surface 3a of the cartridge main body 3 abuts on, and subsequently presses, the pressed portion 105c of the eject lever 105. When the pressed portion 105c is pressed, the eject lever 105 counteracts the urging force of the urge means 106 to rotate. This puts the disk cartridge 1 in a state of being entirely accommodated in the cartridge holder 102. At the same time, the eject lever 105 is brought in a state of being locked so as not to be able to rotate backward by the eject lever lock means 107.

When the lid portion 305 is closed after the disk cartridge 1 has been entirely accommodated in the cartridge holder 102, the cartridge holder 102 follows the lid portion 305 to move from the cartridge insertion and withdrawal position to the recording and reproducing position. When the cartridge holder 102 moves from the cartridge insertion and withdrawal position to the recording and reproducing position, the side surface 105m of the operated portion 105e of the eject lever 105 contacts the inclined surface portion 108e of the lock release means 108, thus deflecting the elastic flap portion 108c in what is called an escape direction. As an end portion of the inclined surface portion 108e moves to reach the position of the operated portion 105e of the eject lever 105, the contact between the inclined surface portion 108e and the side surface 105m of the operated portion 105e of the eject lever 105 is released. This results in the elastic flap portion 108c being elastically returned. Consequently, the engagement portion 108f then engages the lower surface 105n of the operated portion 105e of the eject lever 105.

When the cartridge holder 102 is moved to the cartridge insertion and withdrawal position after recording and/or reproducing of the disk cartridge 1 has been completed, the lower surface 105n of the operated portion 105e of the eject lever 105 is raised by the engagement portion 108f as shown in FIGS. 8A, 8B, and 8C. Locking of the eject lever 105 by the eject lever lock means 107 is then released. The eject lever 105 is now rotated by the urging force of the urge means 106, pushing the disk cartridge 1 out of the cartridge holder 102.

While a preferred embodiment of the invention has been described using specific terms, such description is for illustrative purposes only, and it is to be understood that changes and variations may be made without departing from the spirit or scope of the following claims.

What is claimed is:

1. A disk recording and/or reproducing apparatus, comprising:
   a recording and/or reproducing unit disposed in a chassis, the recording and/or reproducing unit configured to record and/or reproduce a disk cartridge;
   a cartridge holder supported on the chassis configured to move between an insertion and withdrawal position, at which the disk cartridge is inserted or removed, and a recording and reproducing position, at which the disk cartridge is recorded or reproduced by the recording and/or reproducing unit;
   an eject lever disposed on an upper surface of the chassis configured to move in a disk cartridge insertion and withdrawal direction, the eject lever configured to be pressed by an insertion end of the disk cartridge inserted in the cartridge holder configured to move in the disk cartridge insertion and withdrawal direction;
   an eject lever lock unit disposed on the upper surface of the chassis, the unit locking the eject lever configured to move in the disk cartridge insertion and withdrawal direction; and
   a lock release unit mounted on the cartridge holder such that a leading end side of the lock release unit is configured to advance into the cartridge holder from an upper surface of the cartridge holder, the lock release unit configured to move the eject lever in a direction of releasing locking by the eject lever lock unit when the cartridge holder is moved from the recording and reproducing position to the insertion and withdrawal position,
   wherein the lock release unit has,
   a mounting portion mounted to a side surface of the cartridge holder;
   an overlapping portion continuing to the mounting portion and overlapping the upper surface of the cartridge holder;
   an elastic flap portion continuing to the overlapping portion, configured to advance into the cartridge holder through a cutout window portion provided in the upper surface of the cartridge holder and extending toward the side of the chassis; and
   an eject lever operating portion disposed at a leading end portion of the elastic flap portion, the eject lever operating portion configured to move the eject lever in a direction of releasing locking by the eject lever lock unit when the cartridge holder is moved from the recording and reproducing position to the insertion and withdrawal position.

2. The disk recording and/or reproducing apparatus according to claim 1,
   wherein the eject lever operating portion includes an engagement portion; and
   wherein the engagement portion is configured to move in the direction of an upper surface of an operated portion of the eject lever when the cartridge holder is moved from the recording and reproducing position to the insertion and withdrawal position, and the engagement portion thereby lifts the eject lever off the chassis and thereby releases locking of the eject lever by the eject lever lock unit.

3. The disk recording and/or reproducing apparatus according to claim 2, wherein the eject lever operating portion includes:
   an inclined surface portion configured to be pressed by a side surface of the operated portion of the eject lever so as to deflect the elastic flap portion when the cartridge holder is moved from the insertion and withdrawal position to the recording and reproducing position; and an engagement portion configured to engage a lower surface of the operated portion when the elastic flap portion makes a return motion as the inclined surface portion is released from pressure.

4. The disk recording and/or reproducing apparatus according to claim 1, wherein the cartridge holder includes an elastic flap positioning portion configured to maintain the elastic flap portion of the lock release unit substantially at a right angle relative to the upper surface of the cartridge holder by pressing the elastic flap portion of the lock release unit.

5. A disk recording and/or reproducing apparatus, comprising:

a recording and/or reproducing unit disposed in a chassis, the recording and/or reproducing unit configured to record and/or reproduce a disk cartridge;

a cartridge holder supported on the chassis configured to move between an insertion and withdrawal position, at which the disk cartridge is inserted or removed, and a recording and reproducing position, at which the disk cartridge is recorded or reproduced by the recording and/or reproducing unit;

an eject lever disposed on an upper surface of the chassis configured to move in a disk cartridge insertion and withdrawal direction, the eject lever configured to be pressed by an insertion end of the disk cartridge inserted in the cartridge holder configured to move in the disk cartridge insertion and withdrawal direction;

an eject lever lock unit disposed on the upper surface of the chassis, the unit locking the eject lever configured to move in the disk cartridge insertion and withdrawal direction; and a lock release unit mounted on the cartridge holder such that a leading end side of the lock release unit is configured to advance into the cartridge holder from an upper surface of the cartridge holder, the lock release unit configured to move the eject lever in a direction of releasing locking by the eject lever lock unit when the cartridge holder is moved from the recording and reproducing position to the insertion and withdrawal position, wherein the lock release means unit is disposed in a space between an arcuate front surface formed on an insertion end of the disk cartridge inserted in the cartridge holder and a side surface of the cartridge holder.

6. A disk recording and/or reproducing apparatus, comprising:

a recording and/or reproducing unit disposed in a chassis, the recording and/or reproducing unit configured to record and/or reproduce a disk cartridge;

a cartridge holder supported on the chassis configured to move between an insertion and withdrawal position, at which the disk cartridge is inserted or removed, and a recording and reproducing position, at which the disk cartridge is recorded or reproduced by the recording and/or reproducing unit;

an eject lever disposed on an upper surface of the chassis configured to move in a disk cartridge insertion and withdrawal direction, the eject lever configured to be pressed by an insertion end of the disk cartridge inserted in the cartridge holder configured to move in the disk cartridge insertion and withdrawal direction, the eject lever rotatably disposed on a shaft disposed on the upper surface of the chassis, and the shaft disposed, when a cartridge holder in which a disk cartridge is inserted is then disposed at the recording and reproducing position, in a space between an arcuate front surface formed on an insertion end of the disk cartridge inserted in the cartridge holder and a side surface of the cartridge holder;

an eject lever lock unit disposed on the upper surface of the chassis, the unit locking the eject lever configured to move in the disk cartridge insertion and withdrawal direction; and a lock release unit mounted on the cartridge holder such that a leading end side of the lock release unit is configured to advance into the cartridge holder from an upper surface of the cartridge holder, the lock release unit configured to move the eject lever in a direction of releasing locking by the eject lever lock unit when the cartridge holder is moved from the recording and reproducing position to the insertion and withdrawal position.

7. The disk recording and/or reproducing apparatus according to claim 1, wherein the cartridge holder is rotatably supported on the chassis.

* * * * *